(12) United States Patent
LaDue

(10) Patent No.: US 6,185,198 B1
(45) Date of Patent: *Feb. 6, 2001

(54) TIME DIVISION MULTIPLE ACCESS DOWNLINK PERSONAL COMMUNICATIONS SYSTEM VOICE AND DATA DEBIT BILLING METHOD

(75) Inventor: Christoph K. LaDue, Santa Cruz, CA (US)

(73) Assignee: Aeris Communications, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/302,274

(22) Filed: Apr. 27, 1999

Related U.S. Application Data

(63) Continuation-in-part of application No. 08/619,920, filed on Mar. 20, 1996, now abandoned.
(60) Provisional application No. 60/021,516, filed on Jul. 10, 1996.

(51) Int. Cl.[7] ........................................ H04Q 7/20
(52) U.S. Cl. .......................... 370/329; 370/401; 370/465
(58) Field of Search .................................. 370/328, 329, 370/337, 401, 465, 466, 467, 522, 277, 280; 455/422, 450

(56) References Cited

U.S. PATENT DOCUMENTS

| | | | |
|---|---|---|---|
| 4,882,727 | * 11/1989 | Williams et al. | 370/465 |
| 5,492,412 | * 2/1996 | Lannen et al. | 455/432 |
| 5,546,444 | * 8/1996 | Roach, Jr. et al. | 455/412 |
| 5,570,389 | * 10/1996 | Rossi | 375/220 |
| 5,590,133 | * 12/1996 | Billstrom et al. | 370/349 |
| 5,603,081 | * 2/1997 | Raith et al. | 455/435 |
| 5,664,005 | * 9/1997 | Emery et al. | 455/422 |
| 5,857,153 | * 1/1999 | Lupien | 455/422 |

* cited by examiner

*Primary Examiner*—Min Jung
(74) *Attorney, Agent, or Firm*—Blakely Sokoloff Taylor & Zafman, LLP

(57) ABSTRACT

A method and apparatus for full-duplex data communication in or for a wireless communications network, such as a cellular network, PCS network, or mobile satellite network, where a remote feature access control operation utilizes a switch to reserve and route selected voice channels or traffic channels in response to the remote feature access control operation. The method comprising the steps of: configuring a mobile switching center (MSC) to route the selected voice channels to a multi-port protocol converter (MPPC) for transmitting a selected data message on the selected voice channel. Transmitting the selected data message via the multi-port protocol converter on the selected voice channel via a data messaging channel during the remote feature access control operation. Then the selected data message is received at a communicator, which is communicatively linked to a reverse voice and/or digital traffic channel of the wireless network, thereby providing for both forward and reverse messaging on the wireless communications network. An apparatus is disclosed for data communication in or for a wireless communications network for transmitting and receiving both forward and reverse voice, traffic, and control channel messages utilizing the disclosed methodology.

24 Claims, 24 Drawing Sheets

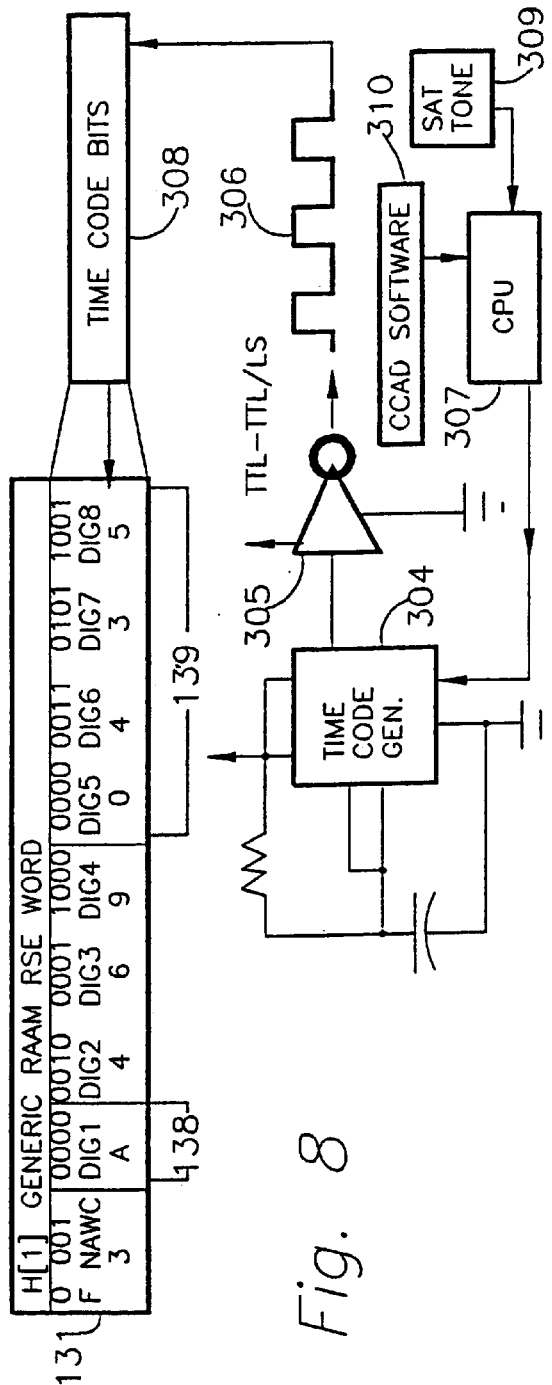
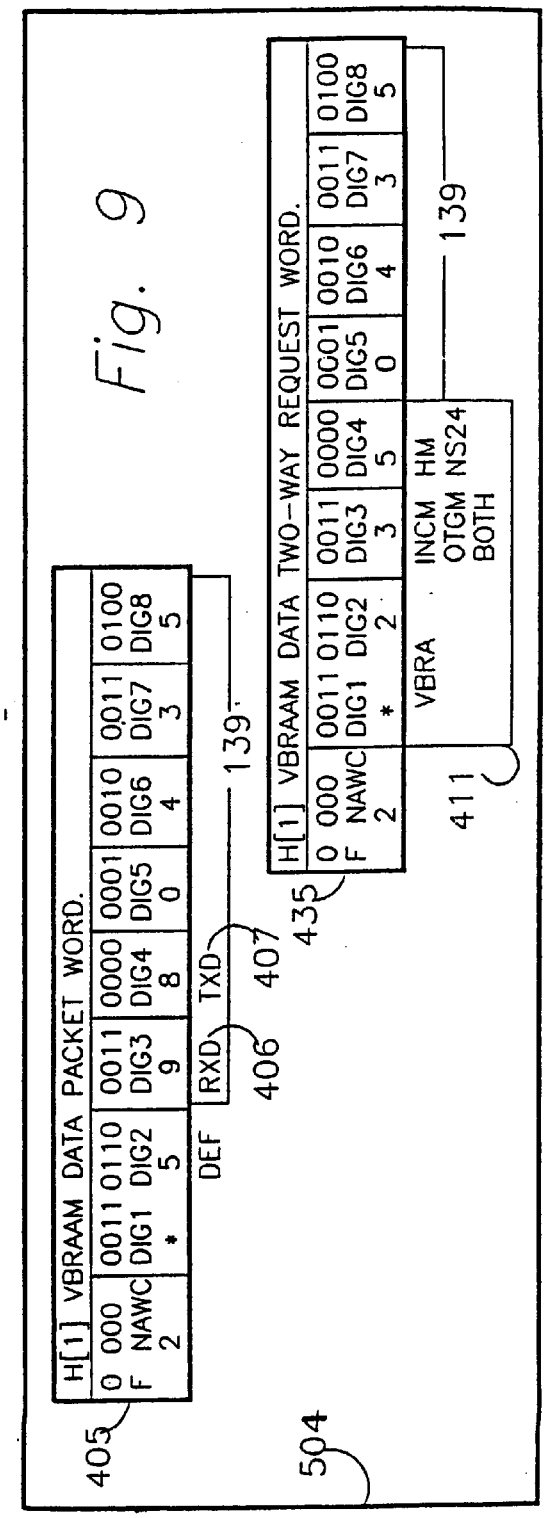
Fig. 8
Fig. 9

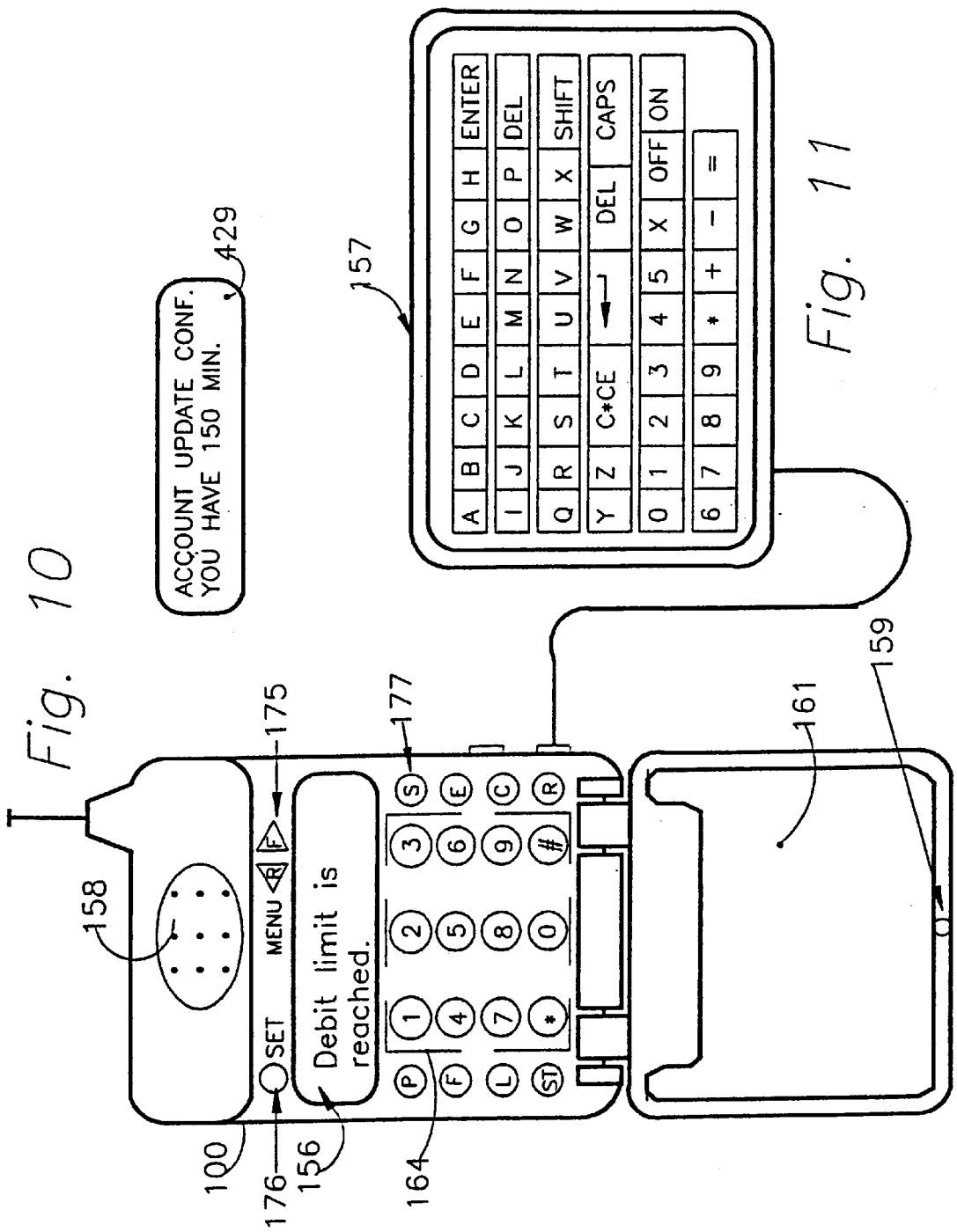

| | | | | | | | | |
|---|---|---|---|---|---|---|---|---|
| A | 1 100 | 1110 | 1011 | 0111110010 | 0111 | 0101101000 | | |
| | F NAWC | TSE | RSVD | SCM MINA | MINB | MINC | | |
| | 4 | | | 498 234 5698 | 7 | 360 | | |

| | | | | | | | |
|---|---|---|---|---|---|---|---|
| B | 0 011 | 00000 | 000 | 00000 | 0 | 00000000 0100110000 | |
| | F NAWC | LOCAL | ORD | Q ORDER | LT | RSVD MIN2 | |
| | 3 | 0 | | | | 304 | |

(408)

DCC=3

| | | |
|---|---|---|
| C | 0 010 | 10000111001010001100111010100000 |
| | F NAWC | SERIAL (ESN) |
| | 2 | |

350

| D WORD ORIG C-ADDR | | | | | | | | | |
|---|---|---|---|---|---|---|---|---|---|
| 0 001 | 0000 | 0010 | 0011 | 1000 | 0000 | 0011 | 1000 | 0101 | 1001 |
| F NAWC | DIG1 | DIG2 | DIG3 | DIG4 | DIG5 | DIG6 | DIG7 | DIG8 | |
| 1 | 1 | 4 | 0 | 8 | 4 | 6 | 9 | 4 | |

| E WORD ORIG C-ADDR | | | | | | | | | |
|---|---|---|---|---|---|---|---|---|---|
| 0 000 | 0011 | 0110 | 0011 | 0000 | 0001 | 0010 | 0011 | 0100 | |
| F NAWC | DIG1 | DIG2 | DIG3 | DIG4 | DIG5 | DIG6 | DIG7 | DIG8 | |
| 0 | 2 | 0 | 1 | 9 | 6 | 5 | 4 | 9 | |

Fig. 13

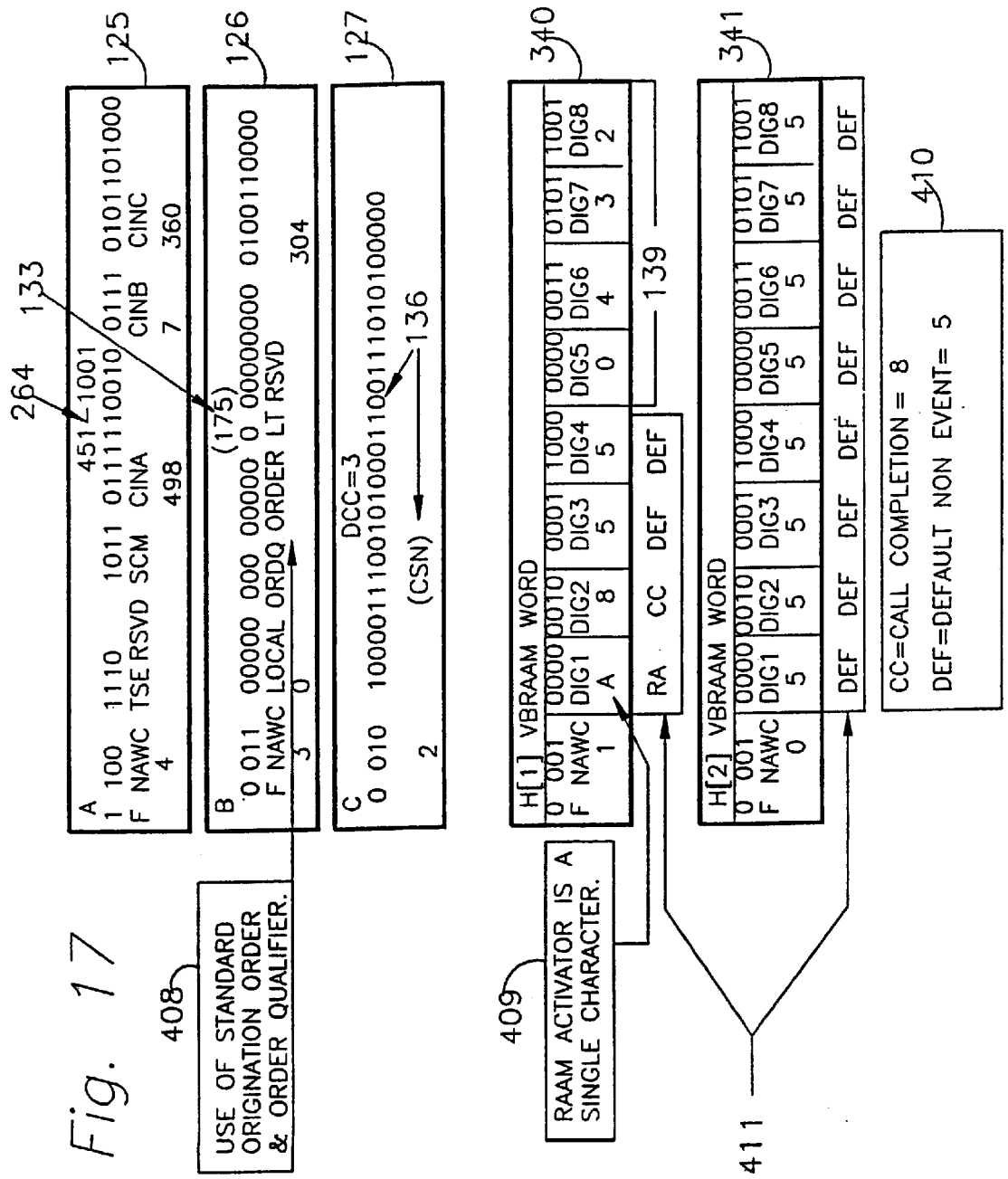

| A | 1 100 | 1110 | 1011 | 0111110010 | 0111 | 0101101000 |
|---|---|---|---|---|---|---|
| | F NAWC | TSE RSVD | SCM CINA | 451-1001 | CINB | CINC |
| | 4 | | 498 | | 7 | 360 |

125

| B | 0 011 | 00000 | 000 | 00000 | 0 00000000 | 0100110000 |
|---|---|---|---|---|---|---|
| | F NAWC | LOCAL | ORDQ | ORDER LT | | RSVD |
| | 3 | | 0 | | (175) | 304 |

126

| C | 0 010 | 10000111001010001100 | 11010100000 |
|---|---|---|---|
| | DCC=3 | | |
| | 2 | (CSN) | 136 |

127

| H[1] | VBRAAM WORD | | | | | | | | | RA | DIR | DEF | DEF |
|---|---|---|---|---|---|---|---|---|---|---|---|---|---|
| 0 001 | 0000 | 0010 | 0001 | 1000 | 0000 | 0011 | 1000 | 0101 | 1001 | | | | |
| F NAWC | DIG1 | DIG2 | DIG3 | DIG4 | DIG5 | DIG6 | DIG7 | DIG8 | | | | | |
| 1 | A | 9 | 5 | 5 | 0 | 4 | 3 | 2 | | | | | |

342

139

| H[2] | VBRAAM WORD | | | | | | | | | DEF | DEF | DEF | MSG |
|---|---|---|---|---|---|---|---|---|---|---|---|---|---|
| 0 001 | 0000 | 0010 | 0001 | 1000 | 0000 | 0011 | 1000 | 0101 | 1001 | | | | |
| F NAWC | DIG1 | DIG2 | DIG3 | DIG4 | DIG5 | DIG6 | DIG7 | DIG8 | | | | | |
| 0 | 5 | 5 | 5 | 3 | 4 | 7 | 2 | 3 | | | | | |

343

118

408 — USE OF STANDARD ORIGINATION ORDER & ORDER QUALIFIER.

412 — MSG EVENT 2 = $25.00 INCREASE.
MSG EVENT 4 = $100.00 INCREASE.

409 — RAAM ACTIVATOR IS A SINGLE CHARACTER.

410 — DIR=DEBIT INCREASE REQUEST / DIR EVENT = 9
MSG=MESSAGE/MSG EVENT 3= $75.00 INCREASE
PIN=PERSONAL IDENTIFICATION NUMBER/MANUALLY ENTERED BY USER
DEF=DEFAULT RSE RSVD CONDITION

TIME DIVISION MULTIPLE ACCESS DOWNLINK PERSONAL COMMUNICATIONS SYSTEM VOICE AND DATA DEBIT BILLING METHOD

RELATED APPLICATIONS

This is a continuation-in-part of Ser. No. 08/619,920 filed Mar. 20, 1996 abandoned. This application is related to provisional patent application 60/021,516 for Variable Burst Remote Access Application Messaging Method and Apparatus, filed Jul. 10, 1996, and to application Ser. No. 08/250,665 abandoned filed May 27, 1994 and application Ser. No. 08/488,839 filed Jun. 9, 1995, which is a continuation-in-part of Ser. No. 08/112,476 abandoned filed Aug. 27, 1993. This application is also related to application Ser. No. 08/571,137 now U.S. Pat. No. 5,779,986 filed Dec. 12, 1995, Ser. No. 08/591,035 now U.S. Pat. No. 5,845,203 filed Jan. 25, 1996, Ser. No. 08/619,002, abandoned filed Mar. 21, 1996, Ser. No. 08/619,363 now U.S. Pat. No. 6,088431 filed Mar. 20, 1996, Ser. No. 08/619,960 abandoned filed Mar. 20, 1996, Ser. No. 08/619,962 abandoned filed Mar. 20, 1996, and Ser. No. 08/619,977 abandoned filed Mar. 20, 1996.

BACKGROUND OF THE INVENTION

1. Field of the Invention

The present invention relates to systems for transmitting and receiving wireless data messages. More specifically, the invention relates to data transmission methodologies and apparatuses for data messaging on wireless communications networks such as Cellular Mobile Telephone (CMT), Personal Communication Systems (PCS), Global System for Mobile (GSM), and mobile satellite networks such as Iridium Satellite and Teledisc Satellite communications networks.

2. Description of Related Art

A variety of methods and apparatuses have been proposed for enabling wireless radio communications based on transmitted data rather than voice. However, serious and significant problems exist in this area as capacity, coverage, transmission quality, and delivery of data messages is limited by available frequencies and limitations inherent in existing transmission schemes. The present invention provides a method for greatly increasing the capacity, performance, coverage, and delivery of data messages over wireless communications networks such as cellular, PCS, and mobile satellite. The present invention utilizes a variable burst remote access application messaging (VBRAAM) method and apparatus to seamlessly, and in an essentially transparent manner to the wireless communications network standards or conventional operating procedures, increase data messaging capability, capacity, and performance by the VBRAAM messaging method and apparatus disclosed.

Although no known prior methods or apparatuses are known to the inventor which disclose either the methods or apparatuses of the present invention, the following series of patents and patent applications filed by the present inventor relate to methods and apparatuses for enhancing the capacity, performance, coverage, and functionality of wireless communications networks. An example is seen in U.S. Pat. No. 5,525,969 to the present inventor where a monitoring device for location verification of a person or object is disclosed. Data verifying the position and status of the object or person may be communicated via cellular control channels of a wireless communications network. Other representative patent applications of the present inventor disclose control channel application data (CCAD) methods, for example, U.S. patent application Ser. Nos. 08/250,665, 08/524,972, now U.S. Pat. No. 5,525,969 and Ser. No. 08/544,977 now U.S. Pat. No. 5,574,399 for transmitting data messages over control channels, for monitoring, control, and communication with various mobile and/or stationary apparatuses, two-way paging applications, vehicle tracking, and the like. Other patent filings by the present inventor disclose a remote access application messaging methodology (RAAM) and a control channel application data remote access application messaging (CCAD-RAAM) seen, for example, in U.S. patent application Ser. No. 08/571,347 where application-specific messaging bits are transmitted over wireless communications network control channels and switches by use of a specially configured data packet configured to appear as an origination data packet within the wireless communications network. Also related to the instant disclosure are patent applications filed by the present inventor for voice and data debit billing methods and apparatuses for cellular, PCS, and mobile satellite. Examples of such filings are U.S. patent application Ser. Nos. 08/619,363 and 08/619,960. The present method and apparatus for variable burst remote access application messaging (VBRAAM) extends such disclosed methods and apparatuses and allows for a seamless and transparent capacity upgrade to wireless communications networks allowing for two-way data messaging, paging, text communication for short messaging, file transfer and Internet access over cellular, personal communications systems (PCS), and mobile satellite networks.

Examples of wireless communications networks allowing for two-way communications include cellular mobile radiotelephone (CMR), which is linked to the public switched telephone network (PSTN) and allows for communications between two mobile radiotelephone users or between a mobile radiotelephone user and a conventional phone. Conventional CMR networks feature a radio coverage area divided into smaller coverage areas or "cells" using power transmitters and coverage-restricted receivers. The limited coverage allows the radio channels used in one cell to be reused in another cell. As a cellular user within one cell moves across the boundary of the cell and into an adjacent cell, control circuitry associated with the cells detect that the signal strength of the radiotelephone in the entered cell is stronger, and communications are transferred to the entered cell. In this manner CMR networks allow two-way communications for an array of cells. However, the frequency spectrum for CMR is a limited spectrum, particularly the voice channels, resulting in the need to increase capacity and data messaging ability.

Many techniques have been proposed and implemented addressing the capacity issue in CMR networks. For example time division multiple access (TDMA) enhancement methods; narrowband (N)-AMPS methods, where the 30 kHz RF channel is split into three discrete 10-kHz channels; direct sequence code division multiple access (CDMA) spread-spectrum technology, where the bandwidth is available in every cell and is shared by spreading each user across the band with a different (uncorrelated) spreading sequence; and other spread-spectrum methods employ frequency-hopping techniques overlaid on conventional TDMA structures.

More recent approaches to enhance capacity and performance in CMR, such as the patents and patent applications of the present inventor cited above, have utilized control, traffic, or access channels of the CMR network for data messaging. Other uses of such channels are seen in Statutory Invention Register H610 to Focarile, Mar. 7, 1989, where a cellular pager is disclosed utilizing call control channels for one-way data messaging. U.S. Pat. No. 5,420,911 issued to Dahlin et al., May 30, 1995 discloses a CMR network utilizing both analog and digital control channels for transmitting analog of digital control information. Somewhat different approaches are seen in U.S. Pat. No. 4,825,457 issued to Lebowitz, Apr. 25, 1989, where a system acts as an adjunct to a landline communications system for security system monitoring, and U.S. Pat. No. 4,831,371 issued to Hess, May 16, 1989, which discloses a method to allocate data channels on a trunked communication system.

Other attempts to increase capacity in a CMR network include U.S. Pat. No. 5,526,401 issued to Roach et al. Jun. 11, 1996, where a data messaging method and apparatus are disclosed for data messaging on a CMR paging network using the manipulation of mobile identification numbers (MIN) and electronic serial numbers (ESN) to send a message over the control channels. A related disclosure, PCT International Patent Application WO 95/24791 of Roach et al. Sep. 14, 1995, disclosed a related control channel data messaging method and apparatus. Such disclosed methods and apparatus, although allowing for limited messaging on a control channel of a CMR, are significantly cumbersome, inefficient, and costly, and such limitations have undoubtedly been a reason such methods and apparatuses have not received widespread acceptance.

Another example of wireless communications networks is personal communications systems (PCS), which are the focus of a tremendous amount of interest, both in the United States and around the world. The global telecommunications network today forms the infrastructure for an information based society where instantaneous communications capability is critically important. PCS networks are projected to permit millions of people worldwide to initiate person-to-person communications using small and inexpensive low-power telephone handsets and related devices. The essential distinguishing technical characteristic of PCS is that the frequencies identified for PCS by the U.S. Federal Communications Commission (FCC) and spectrum-allocation bodies throughout the world are currently occupied by other users. In the United States and several other countries, PCS will be required to share this spectrum with existing users. The FCC has indicated that it will likely allocate the 1.85–1.99 Ghz band to PCS. This band is occupied by private operational fixed microwave users who use this band for point-to-point microwave transmissions. A significant challenge to PCS operators will be configuring systems around existing users without causing interference to those users. Efficient methods and apparatuses for enhancing capacity, performance, and utilization of usable frequencies of PCS are of utmost importance. The present invention provides both a methodology and apparatus applicable to PCS providing thereby a solution to such aforementioned limitations and demands.

The disclosed method and apparatus may also be used with mobile satellite wireless networks, and acts as a public-land-mobile-overlay (PLMN) when signaling systems such as signaling system seven (SS7), IS-41, CITT Blue Book and Red Book 56 kbps, and 64 bps automatic roaming protocols are utilized. The present method and apparatus are also easily adaptable to all cellular and PCS communications systems and IS-41 SS7 networks. Such wireless communications networks are described in Interim Standards (IS) documents and European Telephone System (ETS) documents, and include, for example, cellular IS-533 AMPS, TACS, IS-54B and IS-TDMA, IS-95 CDMA dual mode cellular, and the like. Other networks where the present method and apparatus are applicable include Global System for Mobile (GSM), DCT-1800, DCT 1900, Personal Digit Cellular (PDC), Digital European Cordless Telephone, Personal Handy Phone System (PHS), Cordless Telephone Systems (CTS), and the like.

The disclosed variable burst remote access application messaging (VBRAAM) method and apparatus is a true full-duplex technology, and functions as a national or international system footprint which is essentially invisible to the cellular, PCS or mobile satellite operator. The VBRAAM method does not require any hardware infrastructure changes to existing cellular, PCS and mobile satellite networks. The disclosed method and apparatus allows for two-way data messaging, paging, text communications, real-time metered billings, file transfer, Internet access via cellular, PCS or mobile satellite, and a wide range of other data messaging and remote application and control functions of both stationary and mobile objects.

SUMMARY OF THE INVENTION

Accordingly a method for full-duplex data communication in or for a wireless communications network is provided, where a remote feature access control operation utilizes switch means to reserve and route selected voice channels or traffic channels in response to the remote feature access control operation, the method comprising: configuring a mobile switching center (MSC) to route the selected voice channels to a multi-port protocol converter (MPPC) for transmitting a selected data message on the selected voice channel. The selected data message is transmitted via the MPPC on the selected voice channel via a data messaging channel, which may be a digital or analog voice channel, traffic channel, control channel, access channel, or the like, during the remote feature access control operation. The selected data message is then received at a communicator, for example, a cellular phone, pager, debit phone, or the like, thereby providing a transparent upgrade and enhanced communication capacity on the wireless communications network. This variable burst remote access application messaging (VBRAAM) methodology may be utilized on wireless communications networks, such as cellular, PCS, or mobile satellite.

The selected data message used in the disclosed methodology preferably includes a selected dialed digit stream for communication over the wireless communications network and is further characterized by the step of storing the data message as a stored data message in the MPPC, in response to the wireless communications network receiving a data packet from the MSC.

The remote feature access control operation is preferably a standard IS-41 feature that allows a mobile user to manually enter call routing instructions to a home location register (HLR). Once received, the HLR causes all of the user's mobile or land calls to be routed to another destination. Message waiting indicators may be sent back to the user via the SS7 network to the current serving network, and then relayed to the mobile phone user via forward channels or reverse voice channels, traffic channels, or control channels. The present invention utilizes the remote access feature control parameter quite uniquely, for it becomes an application-specific data message medium in the disclosed methodology. The remote access application messaging (RAAM) feature appears to network operations as a normal origination remote feature access control packet.

Broadly, the disclosed method and apparatus provide a true bandwidth-on-demand, variable burst remote access application forward messaging (VBRAAM) data messaging method, sometimes termed microburst technology. This method preferably utilizes existing algorithms that are an integral function of the remote feature access control operations parameters set forth in such Interim Standards documents as IS-41B, IS-41C, and IS-41D. Means for a special high-speed data Internet socket connection are disclosed that is uniquely interfaced with inbound and outbound switch module routing ports. For example, during a remote feature access control operation, a currently serving switch reserves and routes a forward voice channel to the mobile unit that has activated the remote feature access control operation. The switch also routes the assigned voice or traffic channel to a sound card or tone generator that is interfaced with a designated switch module port. This reservation and routing algorithm allows for the transmission of stutter tones, beep tones, or a voice recording that instructs the user about the status of that particular remote feature access control operation request. Such aforementioned events do not cause mobile switching center billing systems to cause a billable event. Therefore, under current operating standards, the remote feature access control operation is not a billable event.

The disclosed method and apparatus fully utilize these technical operation parameters in the following generally described manner. Instead of routing a forward or reverse voice channel to a switching module port that is interfaced with a tone generator, tone signaling unit, voice recording module, or announcement machine, the switch is programmed via the wireless communications network translation tables to route the reserved forward voice pathway to the present invention MPPC. The MPPC functions as a data protocol converter and data processing terminal that is preferably rack mounted at the mobile switching center (MSC). The MPPC unit may also function as a point-of-presence (POP) on the Internet world wide web (WWW). Software and hardware means connect the MPPC unit logically via special Internet protocols to a VBRAAM messaging center. Messages that have been sent from land-line callers sending pages to VBRAAM communicator users, for example, and special encoded messages may be used for a wide variety of data messaging.

The messaging center (MC) is preferably interfaced directly with the SS7 network via a specially configured home location register (HLR). The HLR is a service control point (SCP) on the SS7 network. The HLR preferably receives a remote access application messaging (RAAM) packet and detects that this event is a VBRAAM request. Then the HLR and other support data processing and management means forward time code stamp information, carrier identification codes, serving switch codes, and other vital data to the messaging center that contains a co-located switch. The particular control channel application data variable burst remote access application message (CCAD-VBRAAM) preferably include a user's selected identification number, CCAD identification number (CIN), and CCAD serial number (CSN), and are also, in one embodiment, forwarded to the VBRAAM messaging center.

Data messages, which may be transmitted from various sources, are preferably stacked in a standby method upon a time of arrival hierarchy at the MC. When the RAAM packet with the aforementioned data arrives at the MC, its data processing terminals forwards the first message that was stored since the last VBRAAM event for that particular user. The message can be an FSK-BCH protocol compatible message designed for AMPS and TACS cellular networks, or a TDMA or CDMA compatible message designed for digital cellular networks. Once the message is sent, it is received by a communicator device, which may be a cellular phone, debit phone, pager, or other communications device. For example, a message may contain a selected data message with a frequency shift keyed block coded multi-word message with a cyclic redundancy rate of five, and contains 100 alpha-numeric characters. The message contains header and tail flag bits. When the VBRAAM communicator detects the tail bits, the communicator then terminates the message call, the currently serving base site performs call-teardown procedures, and the mobile switching center (MSC) completes the VBRAAM event.

A wide variety of data messages may be transmitted using the disclosed methodology. Examples include global broadcast messages, user group messages, point-to-point, point-to-omni point, land-to-mobile, and mobile messages may be sent in this unique and cost-effective manner. For example, a VBRAAM user can send a message from his communicator or phone to another VBRAAM phone business user phone from across the street or across the nation, without incurring long distance charges. In fact, one VBRAAM user can send one message to multiple VBRAAM business users whom are in the same pre-programmed user group, even if each designated user is operating in different cellular, PCS, or mobile satellite markets.

The VBRAAM methodology and apparatus can provide variable length text messages, alpha-numeric messages, encoded debit phone control messages in various data word lengths, full-duplex text, fax, two-way paging, two-way electronic mail, automatic vehicle location tracking, fleet management, motor vehicle anti-theft, child location, home arrest, medical alert, anti-fraud, anti-cloning, and numerous other selected data messaging communications. The length of the message depends upon the currently serving cellular, PCS, or mobile satellite's air interface protocol, and how the remote feature access control operations procedures are programmed. The VBRAAM messaging system is platform independent, and do not require switch and base site hardware or software upgrades. VBRAAM messages typically use from about one to ten seconds in forward analog voice, or digital traffic channel multi-frame seizure, and do not cause a billable air time use event. The VBRAAM forward messaging system is unique and provides a significant upgrade for wireless communications networks for it converts a forward and/or reverse voice or traffic channel to a data messaging medium during the event duration of the present invention's RAAM procedure. Once the procedure is completed, the voice or traffic channel returns to its normal state. That is, the voice or traffic channel becomes a temporary control or data messaging channel, for the VBRAAM messages can contain VBRAAM communicator control and instruction bits.

The present invention also provides for unique call tear-down features. The procedure causes the particular MSC that is currently serving a particular voice call to terminate it upon command from a remote location such as an HLR that is a point of presence on the host SS7 network. The HLR or any other service control point (SCP) can send an IS-41, SS7 message to the currently serving MSC to "drop" the call in such a way that does not disrupt base site operations, in that the call is dropped as if one of the called or calling party hangs up or presses the end button on the communicator. In one embodiment, a CCAD identification number (CIN) is used in combination with a dual personality VBRAAM communicator. The communicator uses, in this embodiment, a CIN number and CSN number that is used only for data communication, debit phone authentication, call and data message activity management, automatic roaming, and other such features. The VBRAAM communicator may also be assigned a mobile identification number (MIN) and electronic serial number (ESN) for local cellular market land-to-mobile and mobile access. This MIN and ESN can be restricted to a designated local market or allowed to roam, depending on the wireless communications network and particular carrier. Since the CIN and CSN may be used to effectively manage both sides of the VBRAAM communicator, the CIN can be used for a wide variety of data messaging applications.

Accordingly, there is also provided a method for data communication in or for a wireless communications network where a remote feature access control operation utilizes switch means to reserve and route selected voice channels or traffic channels in response to the remote feature access control operation, the method comprising the steps of: routing the selected voice channels to means for transmitting data messages on the selected voice channels; transmitting the data messages to the means for transmitting data messages on the selected voice channels; transmitting the data message to a message center interfaced with an SS7 network and a home location register (HLR); storing the data message at the message center as a stored data message; and transmitting the data message to a communicator, and allowing the data message to be communicated on the selected voice channels or traffic channels via a data messaging channel during the remote feature access control operation. The method may utilize remote feature access control operation of an IS-41 remote feature control operation to communicate to a mobile switching center (MSC), and one or more translation tables to route the selected voice channel to a signaling unit.

Means for transmitting data messages on the selected voice channels preferably comprise a multi-port protocol converter (MPPC) and utilize communicator means to receive a data message from a master central monitoring station (MCMS).The disclosed method thus allows for full-duplex data communication using both forward and reverse voice and traffic channels.

Communicator means are also disclosed, including a communicator apparatus with means for data communication in or for a wireless communications network where a remote feature access control operation utilizes switch means to reserve and route selected voice channels or traffic channels in response to the remote feature access control operation; means for receiving a data message via the wireless communications network; means for collecting the data message from the wireless communications network; and means for transmitting a selected data message on the wireless communications network in response to receiving the data message from the mobile switching center (MSC).

Accordingly, a primary objective of the present invention is to provide a method and apparatus for use on wireless communications networks, such as cellular, PCS, and mobile satellite, enabling full-duplex communication thereby increasing capacity, performance, coverage, and functionality of the wireless communications network.

It is an object of the invention to provide an essentially invisible or transparent overlay to a wireless communications network, where the overlay allows for increased capacity, performance, and function, without impacting the normal or conventional operation of the network.

It is an object of the invention to provide both a means and method for real-time metered billing for use in landline, cellular, PCS, mobile satellite, and other wireless communications networks.

It is an object of the invention to provide both a means and method for preventing fraud and cloning in wireless communications networks, allowing for efficient anti-fraud and anti-cloning means.

It is an object of the invention to provide both a means and method for two-way data messaging, paging, text communications, and file transfer on a wireless communications network.

It is also an object of the invention to provide both a means and method for Internet WWW access over cellular, PCS, and mobile satellite networks.

Additional objects and advantages of the invention will be set forth in part in the description which follows, and in part will be obvious from the description, or may be learned by practice of the invention. The objects and advantages of the invention will be realized and attained by means of the elements and combination particularly pointed out in the appended claims.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiments given below, serve to explain the principles of the invention.

FIG. 8 shows an embodiment of a CCAD-DEBIT time code generator in relation to the H[1] word, according to the invention.

FIG. 9 shows an embodiment of a CCAD-DEBIT H[2] messaging word, according to the invention.

FIG. 10 shows a communicator apparatus, according to the invention.

FIG. 11 shows an embodiment of a personal digital assistant (PDA) keypad operably linked to communicator 100, according to the invention.

FIG. 13 shows a conventional wireless cellular network cellular origination data packet with two called address words, according to the invention.

FIG. 17 shows a call completion registration status event multi-word RAAM message, according to the invention.

FIG. 18 shows an embodiment of a request registration status event multi-word RAAM message where a metered debit increase is communicated, according to the invention.

DETAILED DESCRIPTION OF THE PREFERRED EMBODIMENTS OF THE INVENTION

Figure 1:
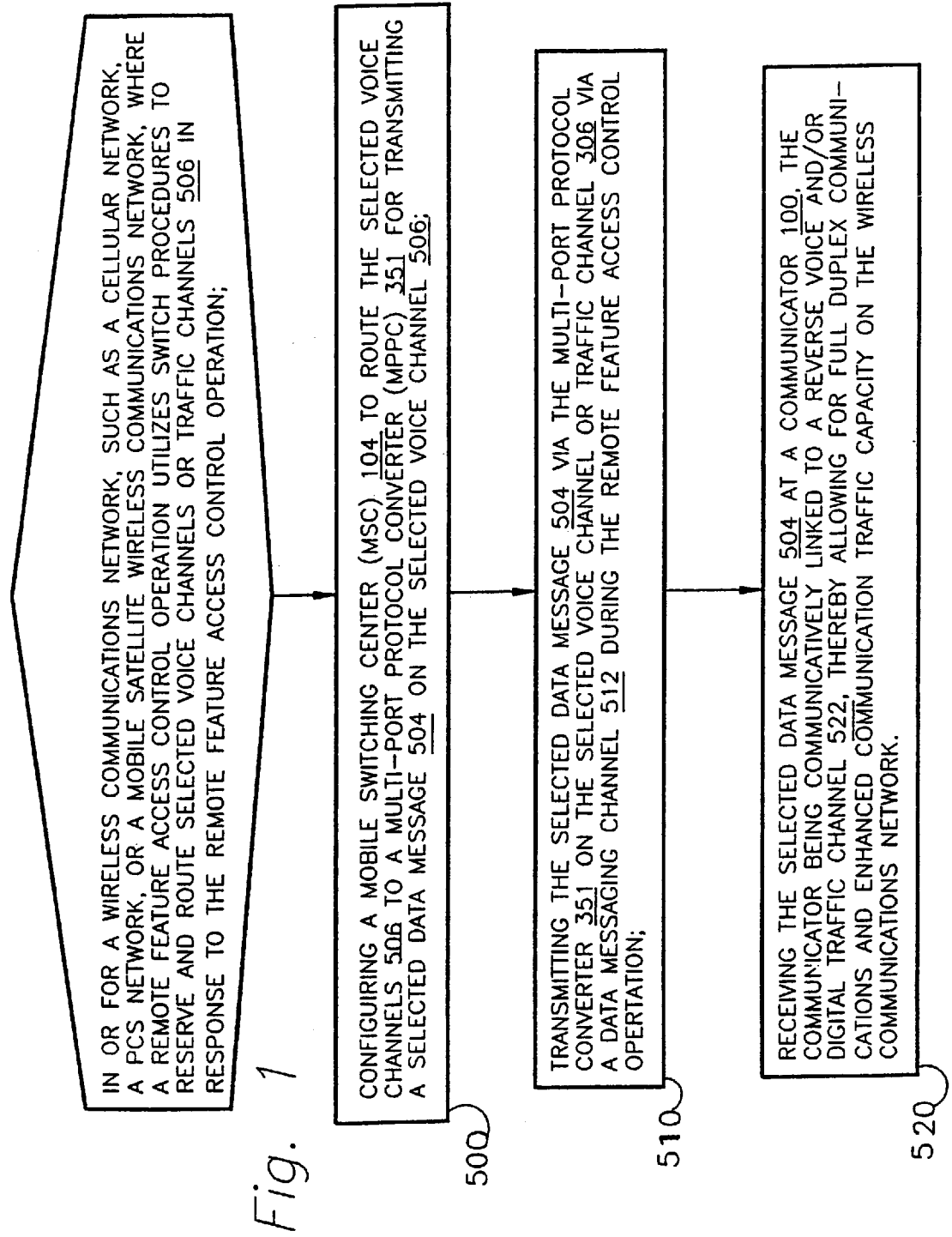
FIG. 1 is a flow chart showing a preferred embodiment of the full-duplex variable burst remote access application messaging (VBRAAM) method of the present invention.

Reference will now be made in detail to present the preferred embodiments of the invention illustrated in the accompanying drawings. In describing the preferred embodiments and applications of the present invention, specific terminology is employed for the sake of clarity. However, the invention is not intended to be limited to the specific terminology so selected, and it is understood that each specific element includes all technical equivalents which operate in a similar manner to accomplish a similar purpose.

Accordingly there is provided a method for full-duplex data communication in or for a digital or analog based wireless communications network, where a remote feature access control operation utilizes switch means to reserve and route selected voice channels or traffic channels in response to the remote feature access control operation. The method, in a preferred embodiment, comprises configuring a mobile switching center (MSC) to route the selected voice channels to a multi-port protocol converter (MPPC) for transmitting a selected data message on the selected voice channel. The selected data message is transmitted via the multi-port protocol converter on the selected voice channel via a data messaging channel during the remote feature access control operation. The selected data message is received at a communicator apparatus. The communicator is communicatively linked to a reverse voice and or digital traffic channel allowing for dual mode communication. The selected data message preferably includes a selected dialed digit stream for communication over the wireless communications network. The data message may be stored as a stored data message in the multi-port protocol converter in response to the wireless communications network receiving a data packet from the MSC.

In accordance with the invention, there is also provided a communicator apparatus allowing for full-duplex communication, such as variable burst remote access application messaging (VBRAAM) messages on the forward and/or reverse voice and traffic channels of digital or analog based wireless communications networks. The communicator apparatus, which may be provided configured for communication over a wireless communications network as, for example, a mobile phone, a pager, a phone configured for real-time metered billing and debit messaging and tracking (DEBIT), a meter reader, a communicator for monitoring and control of remote stationary devices, a communicator for monitoring and control of remote mobile devices, and the like. The communicator referably comprises: means for data communication in or for a wireless communications network where a remote feature access control operation utilizes switch means to reserve and route selected voice channels or traffic channels in response to the remote feature access control operation; means for receiving a data message via the wireless communications network; means for collecting the data message from the wireless communications network; and means for transmitting a selected data message on the wireless communications network in response to receiving the data message from a mobile switching center (MSC). The communicator is further characterized in that the means for data communication on the wireless communications network includes means for transmitting, receiving, storing, and translating a selected control channel application data identification number (CIN) and that the CIN may be communicated by selected programming of call treatment and routing parameter tables of the wireless communications network.

Voice channels are broadly defined herein as both digital and analog forward and reverse voice channels in wireless communications networks. Traffic channels are defined herein as both forward and reverse traffic channels for both analog and digital wireless communications networks. Control channels are broadly defined herein as signaling channels, digital traffic channels that contain logically defined digital access channels, digital signaling channels, primary digital access channels, secondary digital access channels, fast associated control channels, slow associated control channels, authentication channels that utilize analog FSK, digital TDMA, digital CDMA, quadrature shift key control channel protocols, and other wireless analog and digital wireless communications network platforms that are specified in official documents generically designated as Interim Standards (IS), published by the Telephone Industry Association (TIA), American National Standards Institute (ANSI), and standards set by the European Telephone Standard committee (ETS).

In FIG. 1., the preferred steps comprising the VBRAAM methodology are shown. The VBRAAM method may be used in or for a wireless communication network such as a cellular network, PCS, or mobile satellite wireless communications network, where a remote feature access control operation, which is a conventional remote feature access control operation in such network, utilizes switch means to reserve and route selected voice channels or traffic channels 502 in response to the remote feature access control operation. The preferred method comprises the following steps shown in FIG. 1. First, configuring a mobile switching center (MSC) 104 to route selected voice channels 506 to a multi-port protocol converter (MPPC) for transmitting a selected data message 504 on the selected voice channel 502 as in step 500. Next, step 510, the selected data message 504 is transmitted via the multi-port protocol converter 351 on the selected voice channel 506 via a data messaging channel 512 during the remote feature access control operation. In step 520, the selected data message 504 is received by communicator 100. Communicator 100 is communicatively linked to a reverse voice and/or digital traffic channel 522 allowing for full-duplex communications and enhanced communication capacity and performance features on the wireless communications network.

Figure 1A:
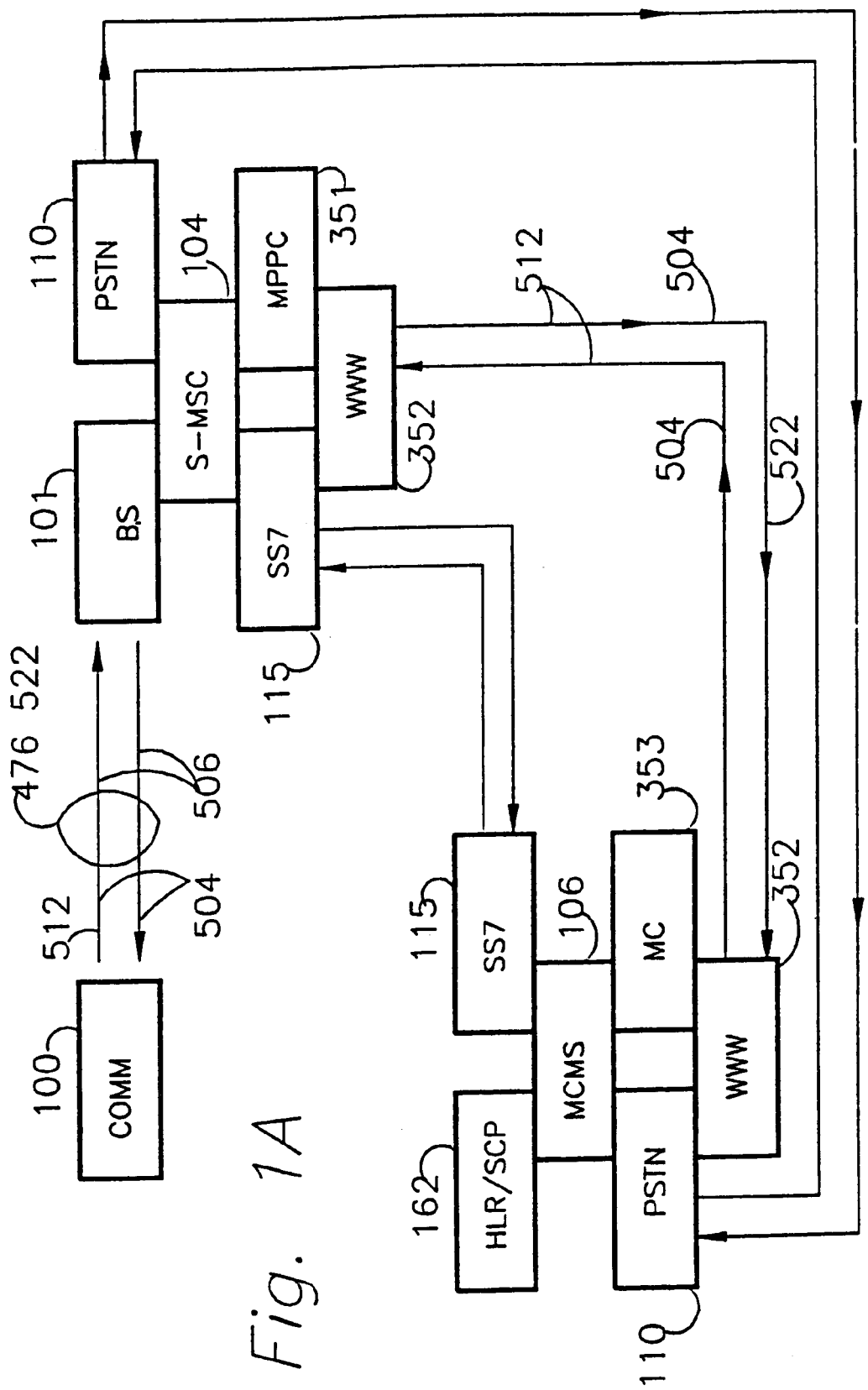
FIG. 1A is a schematic diagram of components of a full-duplex VBRAAM messaging network, according to the invention.

In FIG. 1A, a VBRAAM full-duplex messaging pathway and apparatuses are shown, and as previously mentioned, may be applied to any cellular, PCS, or mobile satellite wireless communications network. The VBRAAM communicator 100, which may be configured as a mobile cellular phone, pager, PCS communicator device, Personal Digital Assistant (PDA) device, or the like, sends and receives data messages, such as selected data message 504 on the selected voice or traffic channels 506 and the reverse voice or traffic channels 522 via data messaging channel 512 as described, and collectively designated as full-duplex air interface 476. A base site 101 communicates with the currently serving mobile switching center (MSC) 104 and processes and distributes the selected data message 504 via the VBRAAM method detailed in reference to FIG. 1. The MPPC 351 is communicatively linked with communicator 100 via full-duplex air interface 476. Full duplex air interface 476 includes the operable transmission of selected data message 504 on the selected voice or traffic channels 506 and the reverse voice or traffic channels 522 via data messaging channel 512 as described. MSC 104 is configured to allow for full-duplex trunking using the VBRAAM methodology. MPPC 351 is also communicatively linked to message center (MC) 352, preferably via Internet world wide web (WWW) socket 352. During conventional remote feature access operation procedures in the wireless communications network, the VBRAAM method is preferably applied as follows. The MSC 104 communicates with the home location register-service point (HLR/SCP) 152 via Signaling System Seven (SS7) 115 protocols. The MSC 104, using full-duplex switching pathways, communicatively links communicator 100 with MPPC 351. Simultaneously, the master central monitoring station (MCMS) 106 data processing terminals forward data message identification, data message categorizing information, and MSC 104 location and identification information to MC 353, which may receive the VBRAAM selected data message 504 via MPPC 351 and WWW 352. If a selected data message 504 is to be transmitted via forward voice or traffic channels, and such selected data message is originally transmitted from a point on WWW 352, or the public switched telephone network (PSTN) 110 to a communicator 100, it may be stored at MPPC 351 or MC 353 or transmitted via VBRAAM. When MC 353 is notified of the pending selected data message by the MCMS 106, selected data message 504 is then preferably transmitted to MPPC 351 via WWW 352. MPPC 351 is programmed to convert WWW socket protocols into MSC 104 trunking and air interface protocol 476 using the VBRAAM methodology, and then the selected data message 504 is transmitted to communicator 100. If communicator 100 has a prepared selected data message to be sent to MC 353, the communicator 100 may transmit such selected data message 504 to MPPC 351 using the VBRAAM method. MPPC 351 is programmed to convert the selected data message into WWW socket protocol and then the selected data message is transmitted to MC 353 which then transmits the message to a designated user destination on WWW 352, or to the PSTN 110, for example.

Figure 1B:
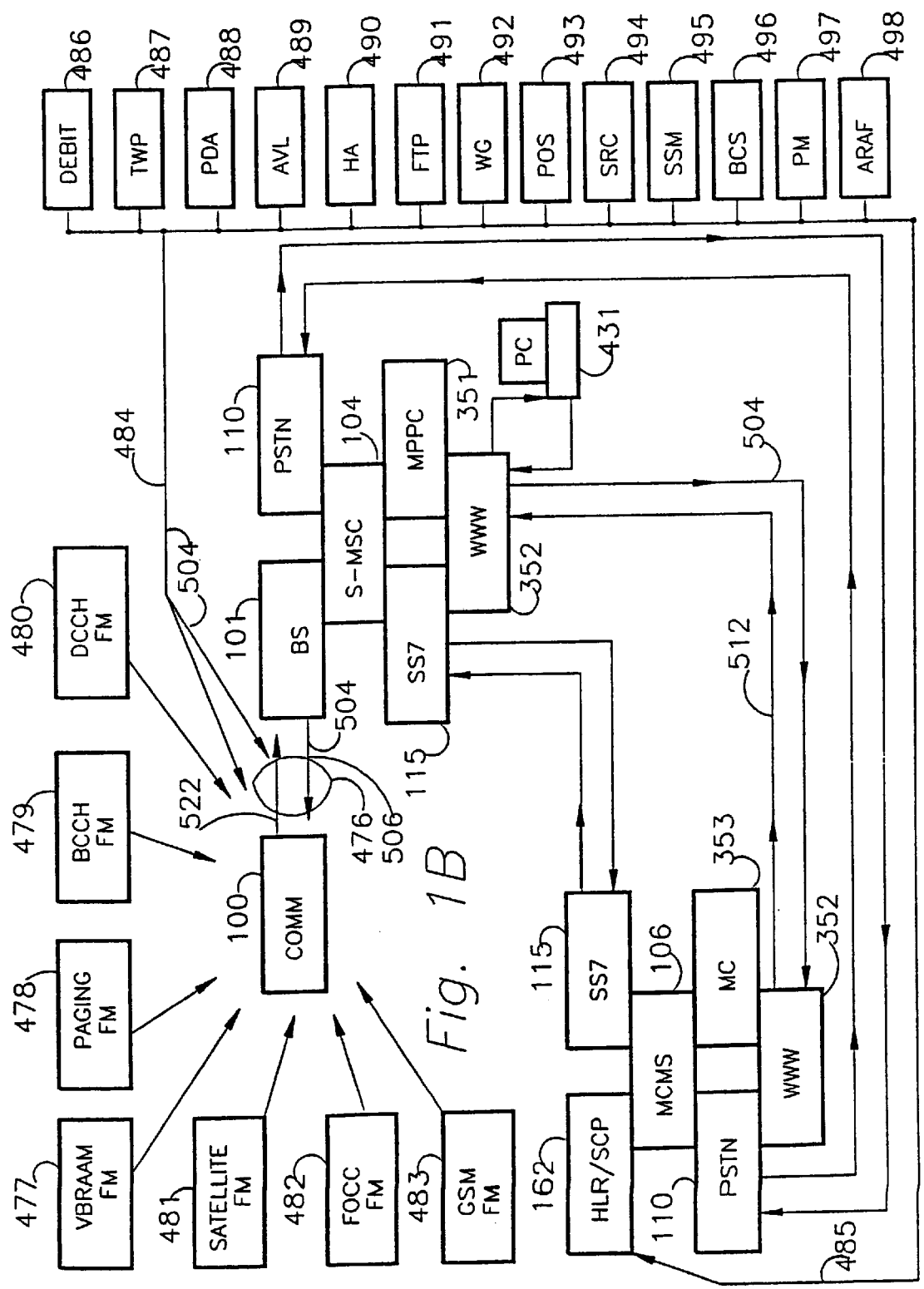
FIG. 1B is a schematic illustration showing preferred components and various downlink pathways for the implementation of the full-duplex VBRAAM methodology and application-specific uses of such methodology, according to the invention.

The VBRAAM method allowing for full-duplex messaging may utilize a wide variety of forward messaging mediums, also known as downlink pathways, as seen in FIG. 1B. MC 353 is preferably configured to forward selected data messages to VBRAAM communicator 100, which may be configured for air interface downlink protocols such as broadcast paging forward messaging 478, broadcast control channel forward messaging 479, as detailed in Global System for Mobile (GSM) standards, digital control channel forward messaging 480 as specified in interim standard 136 (IS-136), mobile satellite forward messaging 477, as specified in Inmarsat P, Teledisic, Iridium and other satellite networks, GSM forward traffic and forward signaling channels 483, analog forward control channel (FOCC) forward messaging 482, as specified in standards documents IS-533 and IS-54B, and other wireless communication network downlink pathways. Communicator 100 may receive selected data message 504, for example, from the VBRAAM forward messaging protocol 477 specified for a particular wireless networks operations standards, and may transmit selected data messages 504 in any forward or reverse traffic or voice channel 506, in the data messaging channel 512, created using the VBRAAM method as described to communicate with, monitor, control, or other selected data messaging application-specific applications 484 to 498. Such application-specific applications such as 484 to 498 include two-way paging, metered billing and debit related data transfer, PDA, home arrest, wireless gaming and/or gambling, stationary remote control, and the other shown applications. MPPC 351 is configured to convert any data message it receives from MC 353 into any downlink pathway serving MSC 104 trunking and air interface standard. The VBRAAM method may also be used to convert a message received from a personal computer (PC) 431 that is a point of presence on the WWW 352, into any cellular, PCS, or mobile satellite signaling and air interface protocols and deliver the selected data message to communicator 100. The VBRAAM methodology creates in this manner a multi-dimensional hybrid wireless communications network. For example, communicator 100 may send selected data message 504 in AMPS cellular analog BCH protocol, and receive a selected data message 504 in IS-136 TDMA protocol. GSM TDMA protocol, IS-95 CDMA protocol, NTT analog or digital protocol, NMT analog protocol, TACS, JTACS, IS-54B TDMA protocol, 2 Ghz PCS protocols, or any other messaging protocols or hybrid combinations thereof.

Figure 1C:
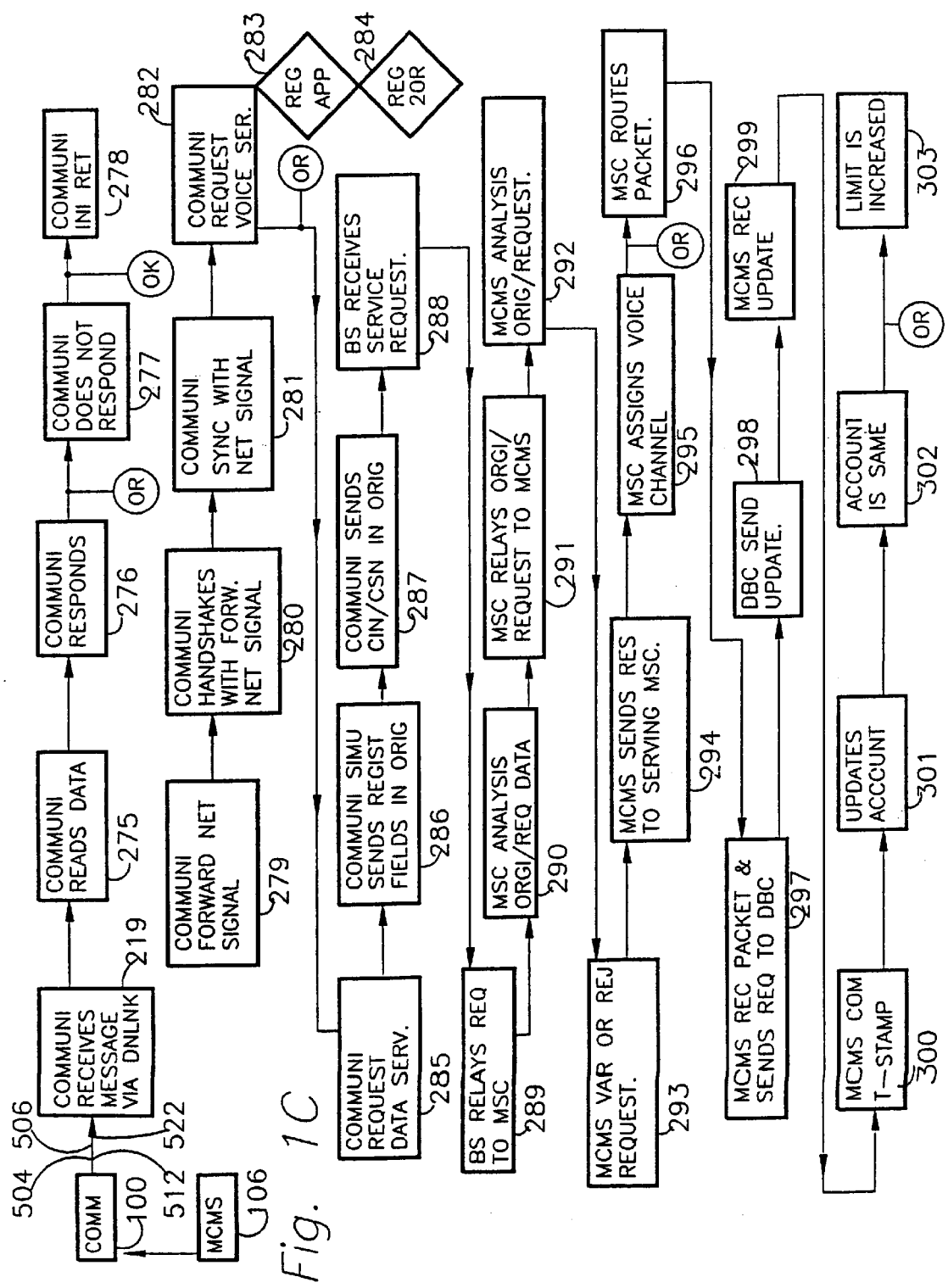
FIG. 1C is a logical block diagram of a control channel application data (CCAD) VBRAAM communications protocol, according to an embodiment of the invention.

Referring to FIG. 1C, communicator 100, which may be any communicator device for use in or for a wireless communications network, and configured as a mobile phone, a pager, a debit phone (DEBIT), which is a cellular phone configured for metered real-time billing and debit transactions, a personal communication services PCS device, a Personal Digital Apparatus (PDA), a stationary device, a mobile device control apparatus, or other communicator device operable on a wireless communications network. In this example, the communicator either receives or transmits 219 a selected data message from the MCMS 106, via selected communications downlink base. Other downlink pathways, in addition to those described in reference to FIG. 1B, include one-way paging networks, DCCH pathways of a host cellular network configured for forward messaging specified in Interim Standard IS-95, forward DCCH messages from a Global System for Mobile (GSM) signaling and/or authentication channel, or messages sent via the present invention VBRAAM messaging data channel 512.

Communicator 100 preferably receives and translates the data contained in the received downlink message 275, and then evaluates and responds 276 to the received downlink message, or does not respond 277, if the message does not require a response at this time. If communicator 100 is commanded to respond either manually or through automated commands, a return response 278 is initiated. In a preferred method, communicator 100 scans and detects forward downlink network channels of host-serving cellular, PCS, GSM, or mobile satellite system 279. Next, communicator 100 engages with forward network channel 280. Preferably, the communicator 100 then is assigned and synchronized with a selected channel, and prepares to send origination data burst 281.

The origination data burst 281 preferably contains a call request for voice service 282, and contains a selected control channel application data identification number (CIN) and a selected control channel application data serial number (CSN) for registration approval and call routing 283. The origination packet also contains register/timer fields with, for example, in a debit phone (DEBIT) embodiment, data related to billing or debit or information, such as 20 minutes of air-time remaining 284. Or communicator 100 may send a message requesting data service 285, and then communicator 100 simultaneously transmits registration, service request and authentication information in origination packet 286, and transmits CIN/CSN in origination packet 287. The base site receives and then detects service request 288 contained in communicator 100 and relays service request data to the serving MSC 289. The serving MSC analyzes the origination request by scanning and detecting the CIN/CSN and remote access application message (RAAM) indicator contained in dialed digit fields 290. The serving MSC then preferably relays data 291 via the origination/registration contained in the dialed digit field data to MCMS 106. The MCMS 106 then analyzes the origination/registration request 292. The MCMS 106 may verify or reject service request 293 by sending either a service approval or service rejection indicator to the serving MSC via the SS7 network 294. If, for example, in a metered billing or debit message, the MCMS 106 approves voice service, the MSC and visitor location register (VLR) then assign a temporary pseudo (SUTTO) number to the communicator or debit phone user and assign reverse voice channel 295. Alternatively, if the message is a data service request, a data service approval/ completion call indicator message is transmitted to the serving MSC, which preferably simultaneously sends a SUTTO number cancellation invoke indicator to the VLR, and then the MCMS 106 routes packet to its application-specific destination.

The application-specific destination can be a two-way paging response center, a bank, a credit monitoring company, a debit bank center, a stationary device control and monitoring center for meter reading or remote environmental monitoring, for example, a mobile device control and monitoring center for tracking vehicles, ships, material flow, packages, or other applications as in 484–498 in FIG. 1B.

The MCMS 106, after receiving the data message request, preferably sends an update or withdrawal message to, in this example, the debit bank center (DBC) 297. The DBC immediately responds and sends communicator or debit phone user account update information 298. The MCMS 106 receives update 299, and time stamps update 300, and then adds new debit account information 301. The account debit limit is the same as a previous inquiry 302, or account limit is increased 303. In this scenario, the communicator or debit phone user is sent an update account acknowledgment indicator in one of the aforementioned ways to the debit phone user via the MCMS 106 to the serving system's MSC, whereby the MSC sends the debit phone user's CIN as a page to the debit phone via the forward control channels (FOCC), forward digital access channels, paging, or traffic channel of the wireless communications network. The CIN is then received, and embedded software means enable a debit increase approval message on the communicator or debit phone liquid crystal display.

Figure 1D:
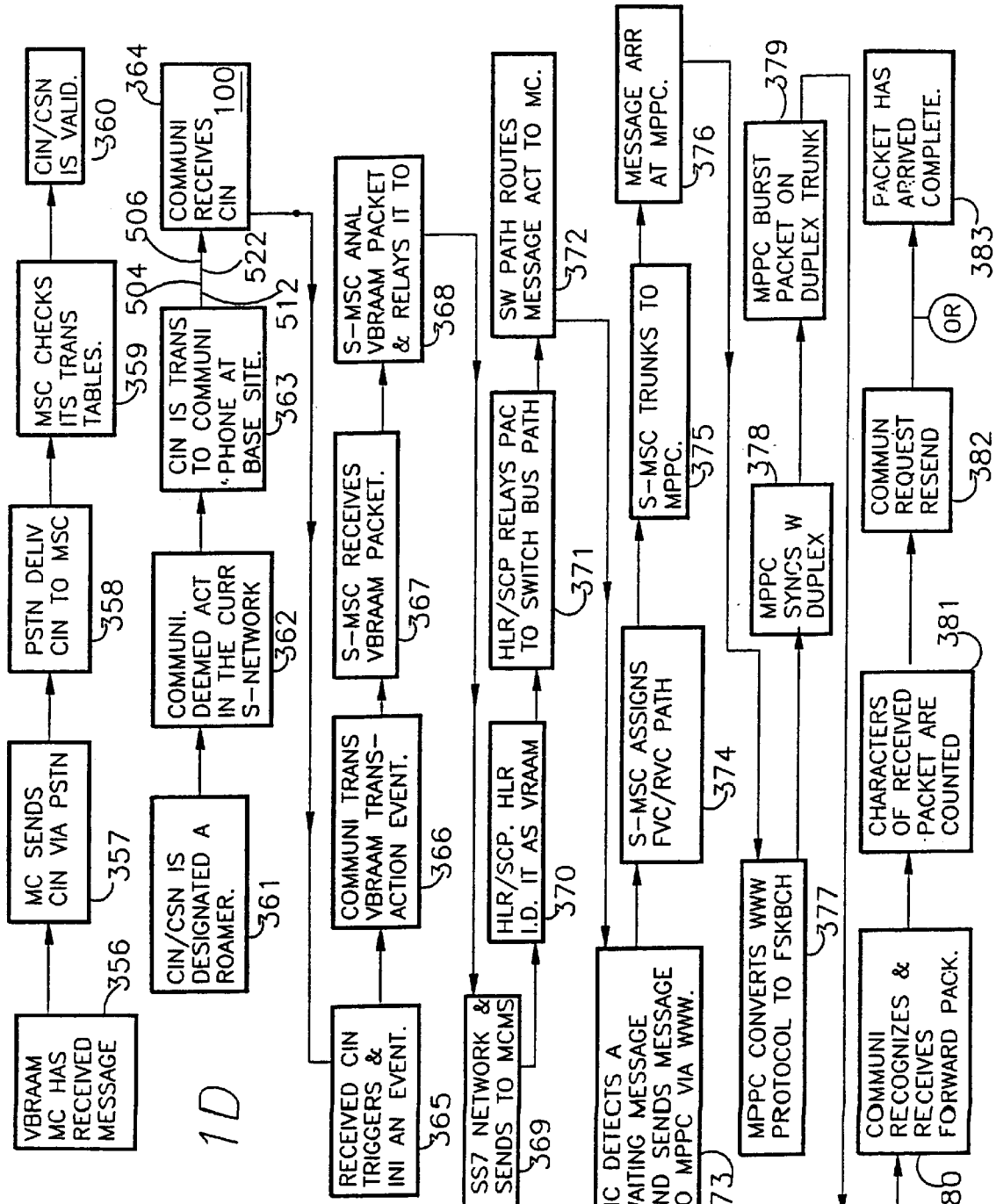
FIG. 1D is a logical block diagram of a preferred VBRAAM forward and reverse messaging communications protocol, according to the invention.
Figure 2:
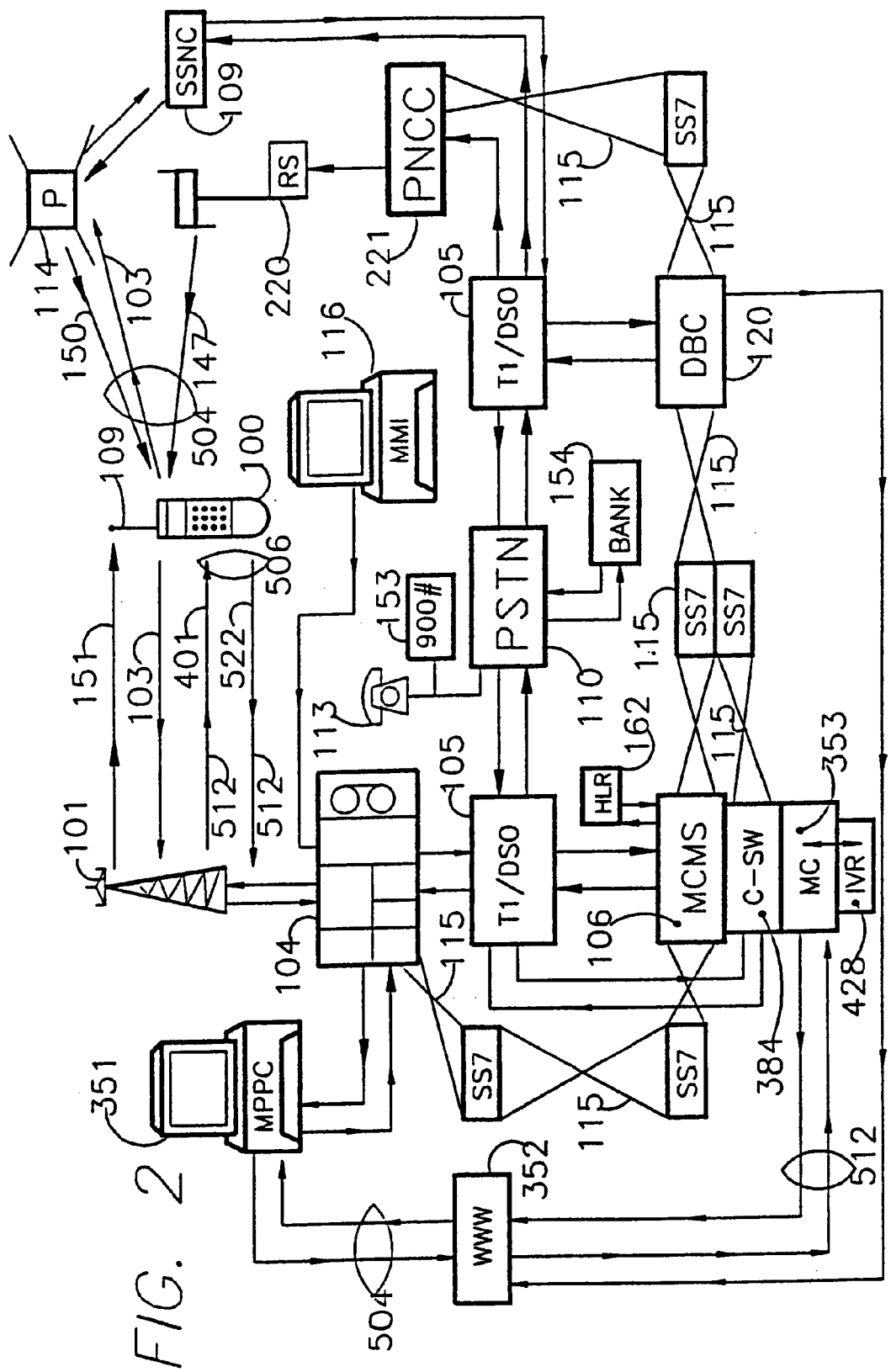
FIG. 2 shows an embodiment of the invention where a communicator is configured as a control channel application data debit (CCAD-DEBIT) communicator for metered billing and debit data and voice communication, according to the invention.

Referring to FIG. 1D, a preferred VBRAAM forward and reverse data channel messaging system protocol for sending selected data messages 504 is shown. The VBRAAM messaging center (MC) is shown having received 356 data message 504 from an application-specific bearer/facilitator such as a stationary device monitoring facilitator, a mobile device monitoring facilitator, debit bank center 120 as shown in FIG. 2, or the like, via the public switched telephone network (PSTN) 100 and/or the world wide web 352. The VBRAAM message center (MC) preferably retrieves the CIN, CSN, carrier identification codes (CIC), and serving switch point codes from a data storage means, such as data storage software, and creates a PSTN/T1 packet. Using a switch, such as VBRAAM switch 384 shown in FIG. 2., the MC switches to a designated trunking pathway, and then sends the selected data message to the currently serving MSC via PSTN/T1 lines 357. PSTN/T1 then transmits the CIN page packet to currently serving MSC 358. MSC 358 then scans and reviews its translation tables and authentication data base 359 by internal software. An authentication data base then may compare and verify VBRAAM selected data message 504 and CIN/CSN as valid through conventional IS-41 automatic roaming authentication methodologies 360. The CIN/CSN causes a VBRAAM messaged communicator user to be deemed a roamer 361. The user of communicator 100 is thus deemed active in the currently serving cellular network 362. The CIN may then be transmitted to communicator 100, for example a debit phone, via a variety of different means, such as via a base site and forward analog control channel (FOCC), or via a forward digital signaling channel, or a forward digital traffic channel 363, or the wireless communications network channels. Communicator 100 is programmed so that when it receives and recognizes its assigned CIN 364, the received CIN triggers, creates, and initiates an analog reverse control channel RECC AMPS, TACS, or NMT VBRAAM packet; or a TDMA IS-136 reverse access channel packet; or a GSM reverse signaling channel packet; or a CDMA IS-95 reverse access channel packet, by use of the VBRAAM activation codes 365 that are transmitted to the base site via the assigned control channel.

Figure 3:
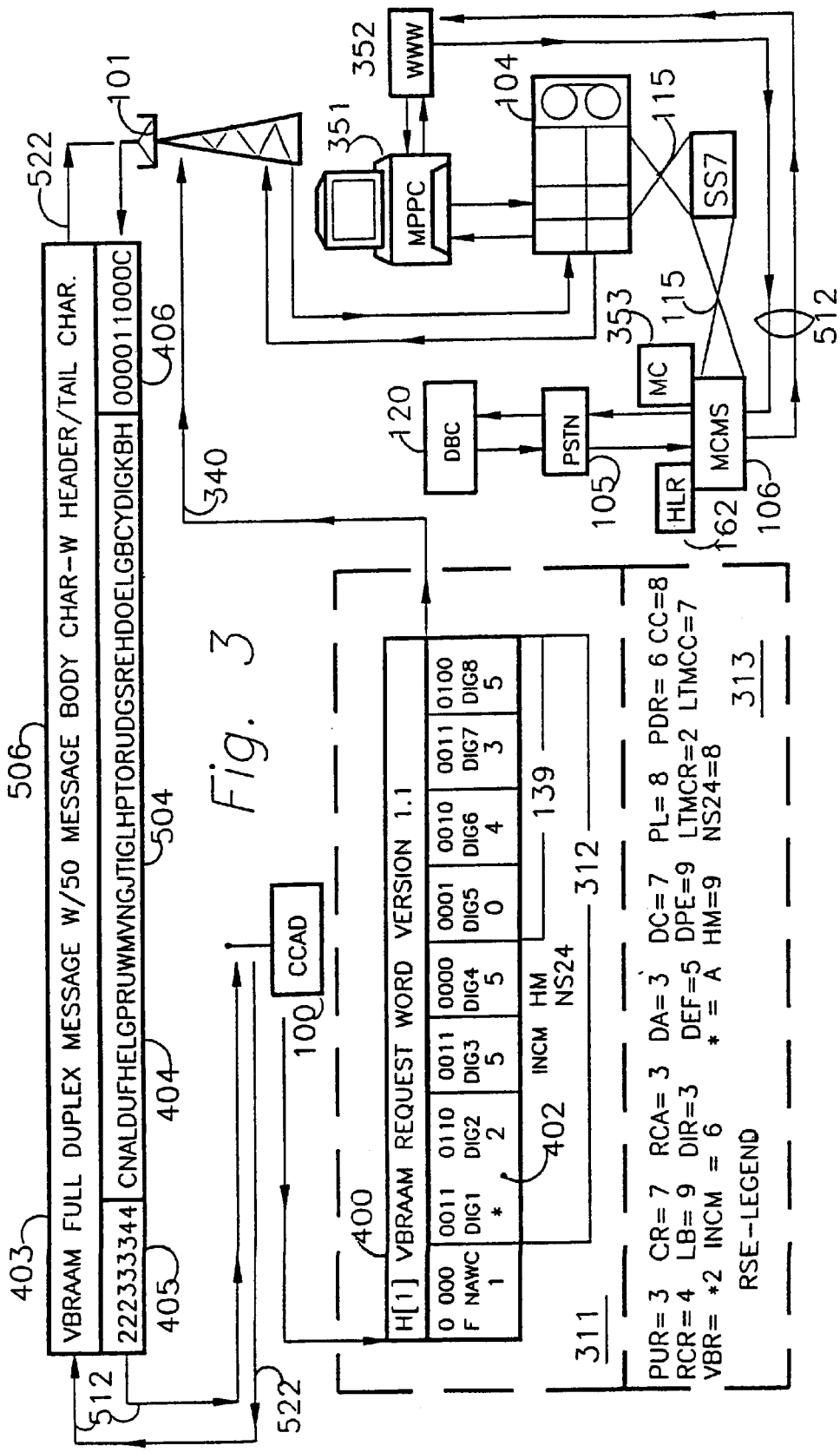
FIG. 3 shows a logic flow diagram of a VBRAAM messaging event, according to the invention.

The disclosed method may also be used for communicating data on up banded or broad band personal communication systems (PCS). Up banded PCS networks operate within frequencies that range from 1850 MHz to 2200 Mhz. Further, such systems as GSM 1900, CDMA 1900, TDMA 1900 can utilize the disclosed control channel remote access application messaging (CCAD-RAAM) short packet and VBRAAM full-duplex data messaging methods, for example for data, text, fax, and other application-specific data messages. For example, a VBRAAM service request or activation packet selected data message which is a true switched messaging medium is transmitted to a currently serving base site, and the base site controller relays the VBRAAM packet to the currently serving MSC 366. The currently serving MSC receives VBRAAM activation packet 367, analyzes the VBRAAM activation packet, and relays it to 368. The host SS7 network 368, and the SS7 networks operating signaling transfer points (STP) and service control points (SCP), transmit and direct the VBRAAM packet to the master central monitoring station (MCMS) 369, and its co-located home location register (HLR). The VBRAAM HLR identifies the received packet as a VBRAAM packet 370. Once the VBRAAM message activation packet 367 and its user identification and current serving location are established via HLR data management protocol, the selected data message with VBRAAM activation codes is sent on assigned switch trunking path 371. Switch path 371 transmits the VBRAAM message activator to the MC data base that is preferably co-located and directly interfaced the VBRAAM switch 372. The MC 353, as seen in FIGS. 2 and 3, is configured to act as a specialized data management system that may either be co-located with the CCAD switch, or remotely located and interfaced with the CCAD switch via the Internet world wide web (WWW). Preferably, the received activation codes, as seen in FIG. 1D, that are specific to a designated user, cause the MC to search its message data base, and in particular check the designated user's message waiting indicators (MWI). If, for example, an awaiting message is detected, the detected message is processed and prepared for transmission by assigning the proper WWW Internet destination point codes (DPC), based on the received currently serving carrier identification codes (CIC), switch codes, and particular user assigned CIN and CSN numbers, that were originally sent from the currently serving MSC to the CCAD-HLR and CCAD-switch via the SS7 network. Next the MC transmits the selected data message to the multi-port protocol converter (MPPC) located at the currently serving MSC via the WWW 373, and the currently serving MSC simultaneously assigns forward voice channel (FVC) and a reverse voice channel (RVC) 522 to the currently serving base site. The base site preferably synchronizes 374 with communicator 100, and the MSC simultaneously assigns a switch routing path that connects to the co-located MPPC 375. Concurrently, the VBRAAM forward message arrives at MPPC 376. The MPPC converts WWW protocol to FSK/BCH protocol, or TDMA protocol, or CDMA protocol 377. The MPPC then synchronizes 378 with assigned duplex trunk path and the assigned forward voice or traffic channel. The MPPC burst the VBRAAM forward message packet on the assigned forward voice or traffic channel 379, and the communicator receives message forward packet 380. The communicator is configured and programmed to count the data characters and detect message packet tail/flag bits 381. If the forward voice channel continuity is lost, and the complete selected data message is not received, the communicator is preferably programmed to automatically request a message re-send by bursting a RAAM packet in the aforementioned manner via the reverse RAAM procedure 382. Or, if tail/flag bits have been detected and counted, then the data message is stored and displayed 383 to the communicator user.

Figure 1E:
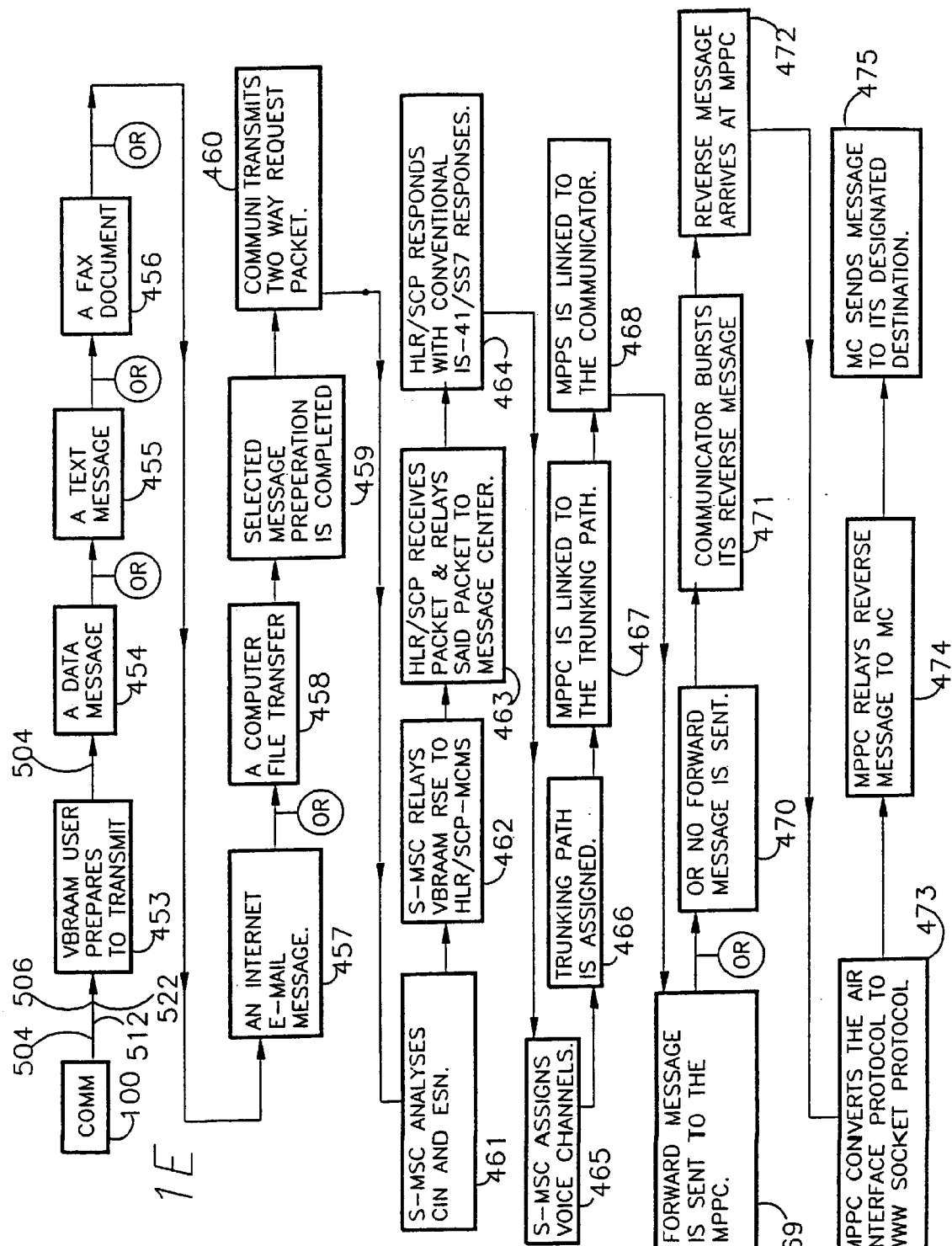
FIG. 1E is a logical block diagram of the VBRAAM full-duplex reverse data channel protocol, according to the invention.
Figure 12:
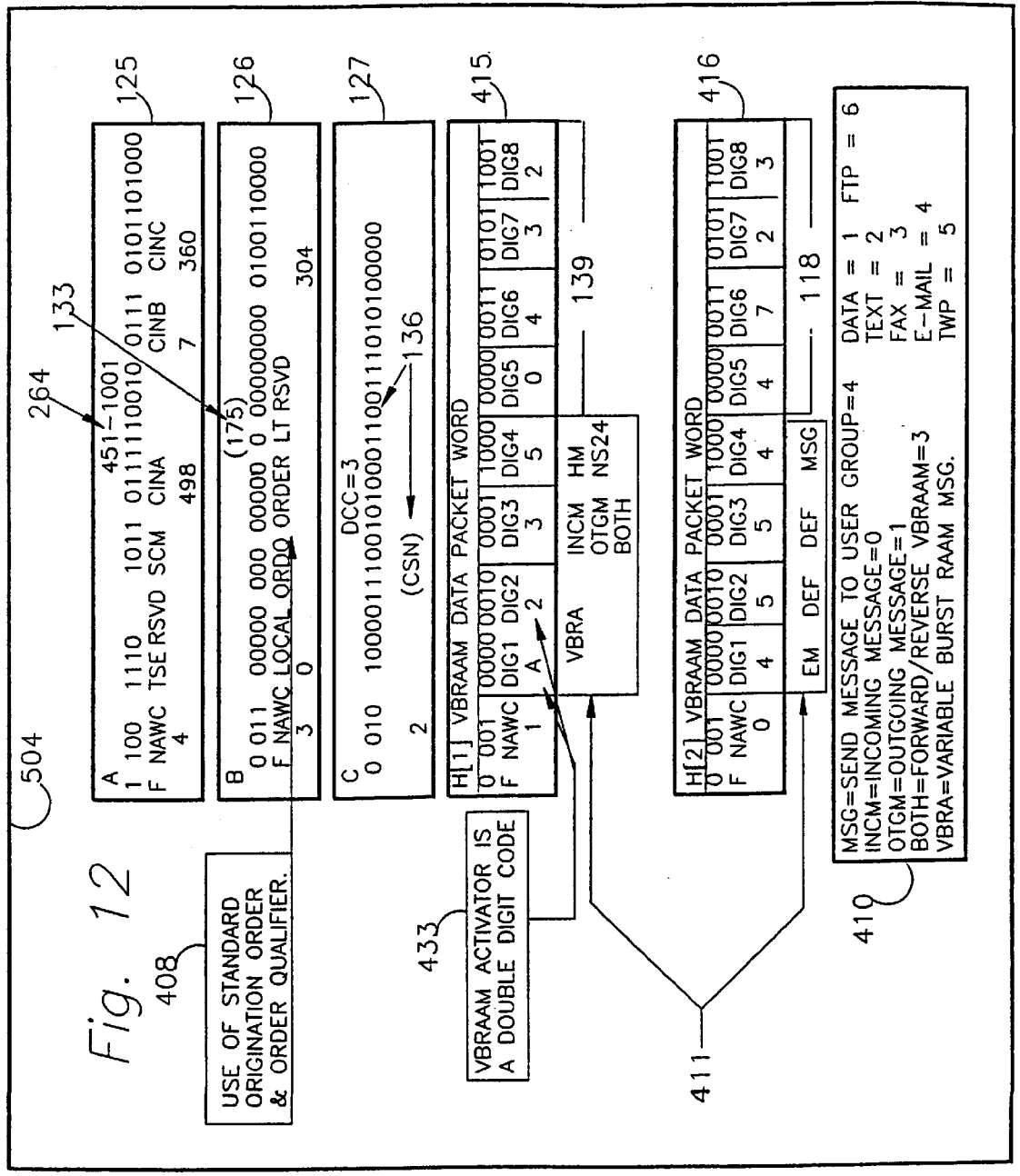
FIG. 12 shows the VBRAAM full-duplex variable messaging RSE request data messaging packet using two H words, according to the invention.

In FIG. 1E, communicator 100 may be configured and used for personal digital assistant (PDA) type applications. For example, communicator 100, in a PDA mode of operation, prepares to transmit 453, a data message 454, text message 455, fax document 456, e-mail 457, computer file 458, or other selected data message 504, which may include a wide variety of data, such as value-added service-related data such as global positioning satellite (GPS) data, remote system control-telemetry data, home arrest data, personnel protection data, motor vehicle anti-theft data, or any selected data message. The communicator 100 user may then transmit 460 a two-way messaging request word 460, seen in FIG. 9, which activates the MC to algorithmically prepare for the reception of the selected data message 504. The MC then transmits the selected data message to the MPPC, which is preferably a point of presence on the Internet WWW and a point of presence within the wireless communications network. The MSC then receives registration status event (RSE) request data packet and analyses the CIN/CSN 461. Preferably, a data number specifier 411, as seen in FIG. 12, contains digit fields which represent to the MCMS and HLR/SCP that this data packet is a variable burst full-duplex remote access application messaging request. For example, digit one and two have the symbol "*" and number 2, respectively. Digit field number three contains a "3" that indicates to the MCMS and HLR/SCP that this data packet is a request for both forward and reverse messaging. The MSC then relays 462 the VBRAAM full-duplex message RSE request packet to the HLR/SCP and MCMS via the host SS7 network. The RSE request packet is then relayed 463 to the message center, which is preferably a point of presence on the Internet WWW, which scans and analyses the message to determine the type of message and designation. The HLR/SCP responds 464, preferably with conventional IS-41 SS7 coded responses which are then received at MSC, which then assigns 465 forward and reverse voice or traffic channels 506 and 522. Simultaneously, MSC 104 assigns 466 a full-duplex trunking path to the MPPC communicatively linked to the previously assigned air interface voice paths from communicator 100 to the MPPC. If the message center 353 (MC) has an awaiting selected data message for this communicator 100 user, the selected data message is forwarded 469 to the MPPC. If no selected data message is waiting 470, the MPPC is programmed to transmit an auditory stutter tone to communicator 100 for the duration of any reverse messaging event. The VBRAAM selected data message 504 may then be transmitted 471, and arrives 472 at the MPPC, which analyses and counts 460 tail bits within the selected data message. The MPPC then ceases transmission of the stutter tone and algorithmically causes the MSC to commence event or call teardown procedures. If, for example, the MPPC had a forward selected data message waiting for the communicator 100 user, and the communicator 100 user simultaneously sends a previously prepared selected data reverse message, the MPPC both transmits and receives the full-duplex messaging event. If the forward selected data message is longer than the reverse selected data message, communicator 100 is programmed to burst, on the selected reverse channel 522, a completion tone or data trailer to indicate to the MPPC that the forward selected data message is received, and communicator 100 along with the MPPC commences conventional call teardown procedures. On the other hand, if the reverse selected data message is longer than the received selected data message, the MPPC awaits the previously described reverse message tail bits and simultaneously, along with the MPPC, commences conventional call teardown and event completion procedures. The MPPC then converts the received reverse selected data message into WWW Internet socket protocol 473, and relays the converted message to message center (MC) 374. The MC then relays 475 the selected data message to its designated destination.

Figure 4:
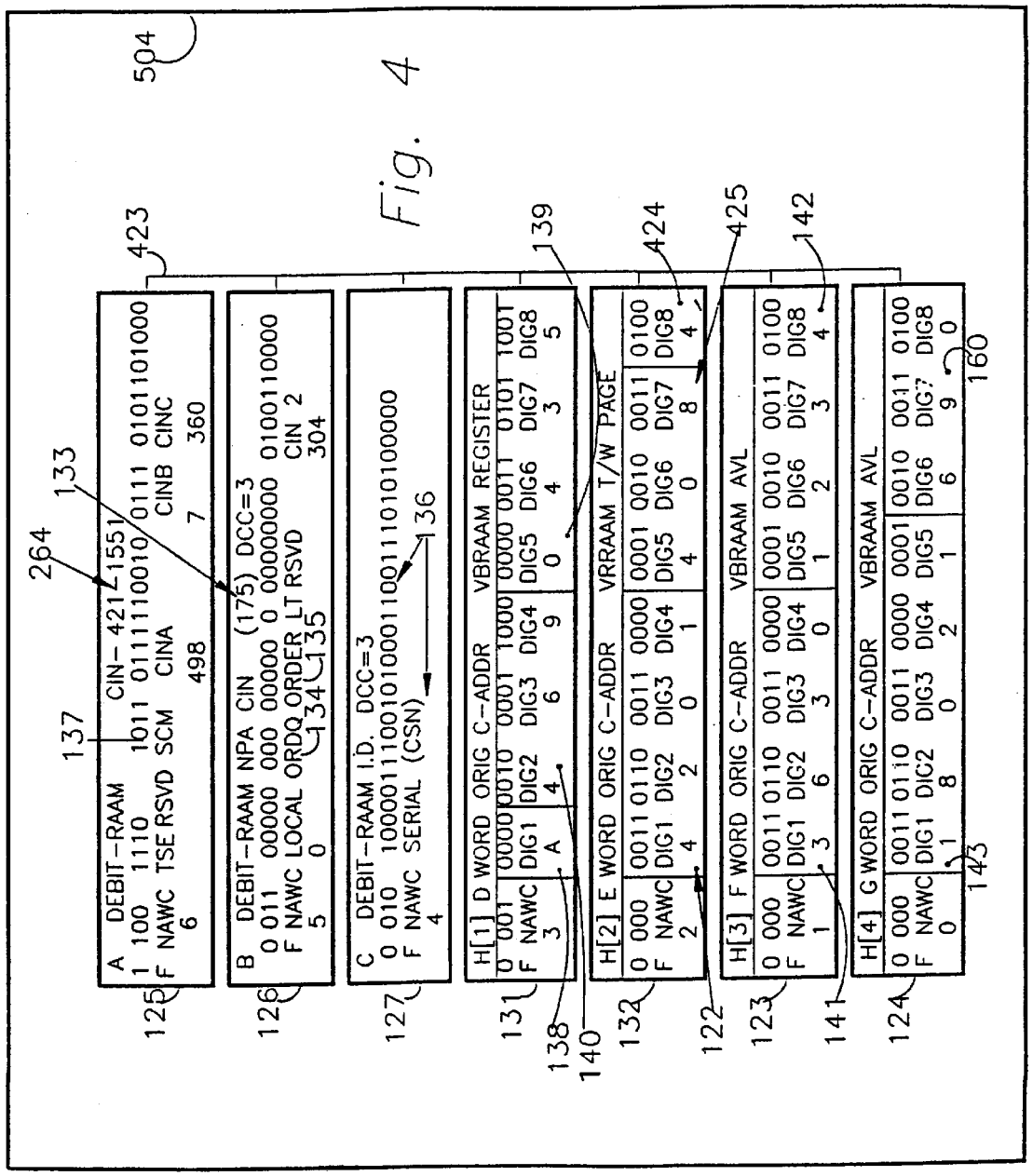
FIG. 4 shows an example of a CCAD-DEBIT (metered billing and debit data) analog FSK 10 KBPS RECC control channel origination data packet message, according to the invention.

With reference now to FIG. 2, principal functional elements of a wireless communications networks such as a cellular, PCS, or mobile satellite network are shown communicating using the full-duplex VBRAAM methodology. In the example, the VBRAAM communicator 100 transmits 103 a control channel application data variable burst remote access application messaging packet CCAD-RAAM. This selected data message 504 preferably contains the one-character CCAD origination-remote application message (RAAM) activator, the CCAD time code generated four-character data fields, four character PIN number and other origination and service request and status data. For example, as seen in FIG. 4, a five- to seven-word packet contains an H[1] word 131 that is configured as a generic registration status event (RSE) word that contains the RAAM activator 138 data character. This data character, along with the special ten-digit CCAD identification number (CIN) 264 that is included in the A word 125 and B word 133, causes the currently serving mobile switching center (MSC) to recognize the received packet as a VBRAAM RSE packet and then route the packet to the CCAD HLR 162 via the SS7 network 115 as shown in FIG. 2. The communicator user may cause a VBRAAM selected data message 103, to be sent for various purposes, such as two-way communication, paging, control of a stationary or mobile device, remote monitoring, and the like. However, for a great majority of VBRAAM data message packet transmission events, communicator 100 is programmed to automatically direct registration status event (RSE) response packets to be transmitted to the nearest serving cellular or PCS base site 101, or to a mobile satellite, in this example an Inmarsat P mobile satellite 114. Communicator 100, in one embodiment, is equipped with an integrated 900 MHz broadcast pager receiver. The pager receiver may receive alpha-numeric pages, commands, and anti-fraud multi-key encrypted messages 147 from the currently serving paging transmission tower 220 and paging network control center (PNCC) 221 that is communicatively linked to MCMS 106 via SS7 115, PSTN 110, and T1/DSO links 105. Communicator 100 may also be equipped with a mobile satellite transceiver that is configured for reception of Inmarsat P signals. The signals can contain alpha-numeric messages, commands and anti-fraud multi-key encrypted messages 150 from the currently serving Inmarsat P satellite 114 and satellite ground station network control center (SSNC) 109. The SSNC is preferably connected to the MCMS 106, having the same type of SS7 115, PSTN 110, and T1/DSO links 105.

If the disclosed VBRAAM methodology is to be used for a metered billing or debit type application, debit communicator/phone is preferably deemed a "roamer". Currently there are two major roamer networks; the North American Roamer Network (NACN) and ITE or GTE Mobilelink network. In combination with the IS-41 SS7 network, which is similar to the Internet WWW in terms of switches and is now ubiquitous throughout the United States, this enables and extensive and ubiquitous coverage. Of course, the method may also be used with the 64 kpbs SS7 network now utilized in Europe and Asia. In a metered billing or debit message embodiment, the method is preferably "added" to cellular and PCS networks, particularly at the mobile switching center (MSC), and requires only about an hour of system programming time. The programming simply involves updating call treatment and routing parameter tables, and creating a new class of debit service, by assigning special mobile identification numbers (MIN) termed and previously described as CCAD Identification Numbers (CIN). The CIN is, in this embodiment, a ten-digit number that is used in the same way as the MIN, but it cannot be used to place a land-to-mobile call from the public switched telephone network (PSTN). The CIN may be used for data messaging for system management, user identification, and debit account updating procedures. This call routing or parameter table programming does not involve updating switch operating system software, or any other aspect that might involve software "patches" and revisions. These switch software patches or revisions may be produced and incorporated during switch manufacture. The control channel application data debit (CCAD-DEBIT) system may be used in cellular and PCS debit and anti-fraud and anti-cloning applications.

In FIG. 3, a forward messaging protocol is shown, with an air interface premised on AMPS IS-553 and TACS analog RECC control channel standards, and is preferably used with communicator 100 for voice based communications in a dual personality configuration. The term "dual personality" refers to a configuration of communicator 100, which is operable in both analog and digital wireless networks. As previously described, both forward and reverse messaging is possible using the VBRAAM methodology on forward and reverse voice and traffic channels. In this embodiment, the data management functions of the dual personality communicator 100, preferably "looks" and "acts" upon the same currently serving wireless communications network as if it was a separate and distinct cellular communications apparatus, with its own unique radio frequency fingerprint, its own CCAD serial number (CIN), and its own data-only CCAD identification number (CIN). The currently serving wireless communications network, for example a cellular network, "sees" this data management, CIN/CSN side of the communicator 100 as it would a conventional cellular mobile telephone. For example, if a digital and analog dual mode communicator 100 user travels into a serving cellular system that is compatible with only the AMPS analog standards then the CCAD-AMPS protocol 107 voice service support protocol is used, as shown in FIG. 13. Because of its unique design and programming, data encoding, and monitoring means, communicator 100, however, allows for the many additional functions, data messaging, coverage, capability, and applications discussed herein and differs greatly from current cellular phones, for example. In fact, such functions, data, protocols, and algorithms are completely transparent to the cellular network. This operational transparency is a critical and unique feature of both the VBRAAM method and communicator 100. The VBRAAM methodology and communicator 100 provide a transparent overlay which increases network capacity, performance, and functionality when used with any cellular, PCS, or mobile satellite system that adheres to IS-41 operational specifications. Accordingly, the wireless communications network infrastructure does not need to be modified significantly in order to implement the present invention's systems and services on a worldwide basis.

A preferred VBRAAM forward messaging protocol is shown in FIG. 3 where an H[1] word 400 is utilized as a VBRAAM request word 311 that includes dialed digit fields for selected data messaging. VBRAAM RSE status legend 313 shows a group of possible H[1] word data field interpretations. For example, if the VBRAAM user requests metered billing or debit related selected data messages, legend 313 depicts a group of possible debit status H[1]

word data field interpretations and the symbol PUR is interpreted as a power-up registration. As shown in FIG. 3, the symbol RCR is interpreted as roamer charge rejection, the symbol CR is interpreted as a voice call request, the symbol RCA is interpreted as a roamer charge approval event, the symbol DIR is interpreted as debit amount increase request event, the symbol DC is interpreted as a drop call event, the symbol PL is interpreted as a power loss event, the symbol PDR is interpreted as power down registration, the symbol CC is interpreted as a call completion event, the symbol LB is interpreted as long distance call block, local call authorization only, the symbol DIR is interpreted as a debit limit increase request event, the symbol VBR=*2 is interpreted as variable burst remote access application messaging activation character set, and the symbol INCM is interpreted as an incomplete message.

When a VBRAAM selected data message is received by the communicator 100, software and circuitry means within communicator 100 are programmed to create a symbol, and apply it to a H[1] VBRAAM request to re-send word 400, that indicates to the MCMS 106 that a particular message needs to be resent to the same user. For example, when communicator 100 is operating in a mobile environment, the assigned forward message channel may drop the selected message during its transmission event. In such case, the user would typically not be charged by the wireless communications network for an incomplete transaction, and the message would be resent so that the user could benefit from the information contained in the message. The symbol DEF is interpreted as default non event, and this is used when a particular RSE requires that certain data character fields are to have no RSE meaning. In this example, the number five character determines that a particular data field is being categorized as reserved data temporarily for that specified RSE event. The symbol DPE is interpreted as a data packet event and used if communicator 100 is equipped with a broadcast pager and the DPE event is a two-way paging response. The symbol LTMCR is interpreted as a land-to-mobile call request and interpreted as a land-to-mobile call completion. The symbol HM is interpreted as "hold messages do not send." The symbol NS24 listed below the digit 4 field is interpreted as "no global broadcast or special service messages for 24 hours," or various time base settings can be used such as a twelve-hour stoppage, etc. All data messages that communicator 100 responds to, or initiates due to user action in terms of service request and status response, are preferably deemed registration status events (RSE). However, to the currently serving cellular, PCS system, or mobile satellite network, the RSE is nothing more than a cellular phone user, for example, requesting remote feature access operation during a system access origination procedure. Therefore, such utilized RSEs are effectively transparent to the currently serving cellular network. The communicator's CIN/CSN functions do not affect autonomous registrations in the conventional sense, nor does communicator 100 always respond to a global action message registration increment, unless signaled to do so by the host carrier, whether cellular,.PCS, or mobile satellite. Preferably, communicator 100 is programmed to register with the MCMS HLR 162 every time a communicator user requests service via an RSE. This protocol minimizes the wireless communications network control channel traffic. Accordingly, communicator 100 may operate as a "sleeper phone," that only registers per RSE event, if desired. The MIN/ESN or voice service side of the dual personality is preferably configured to operate in a conventional manner with the wireless communications network operating procedures, for example, with a host cellular network operating procedure.

Under IS-553 and IS-41 guidelines and operating procedures, an origination event and a remote feature access event are also serving system registrations, and home system authentications. The VBRAAM method's MCMS HLR is the communicator 100 home system and therefore serves as a hub for user authentications. The eight application-specific data fields 312 shown contain digits in the H[1] word that reflect a particular RSE procedure. In this H[1] VBRAAM request word 400 example, the eight data fields contain a specific data character arrangement. Digit 1 and digit 2 contain a * and a 2 respectively; the symbol * is a hexadecimal A in terms of conventional telephone signaling guidelines. In these fields the data relates to a RSE event that specifies a VBRAAM selected message request. This request can be triggered autonomously by the user of communicator 100. In this example, communicator 100 did not create and transmit an automatic request response due to a dropped message event. The aforementioned communicator 100 circuitry and software create the H[1] VBRAAM message request word to instruct the MCMS 106 and the MC to hold all messages until further notice. Digit 3 in this request word contains a DEF 5, however, this data field space can also contain a number 6 to indicate to the MCMS 106 and MC 353 that this H[1] word was sent as result of a dropped message, and that the most recent sent message needs to be resent. In this scenario, digit 4 contains a DEF 5, which indicates a non-action event in this digit field for this particular message. However, in another scenario digit 4 may contain a number 9 that instructs the MCMS 106 and MC 353 to hold all received and stored messages until further notice.

If a communicator 100 is used in a particular serving cellular, PCS or mobile satellite network, it is subject to VBRAAM forward global broadcast messages, unless the user elects not to receive a global broadcast message. For example, a user may sign up for stock market report services such as the Dow Jones Wireless service. The user may sign up for this service whereby global broadcast messages can be delivered to him, or have individual messages sent from his personal stockbroker. However, on some busy business days the communicator 100 user can opt to not receive the stock market report service for 12 to 24 hours, and send the VBRAAM request word just for that purpose. In FIG. 3, the VBRAAM forward message word 403, which is selected data message, may be configured in any analog word block or digital multi-frame word format used in cellular, PCS or mobile satellite networks. For example, it may be configured as an FSK BCH 10 Kbps word, an IS-136 TDMA multi-frame word, an IS-95 CDMA word, or a Global System for Mobile (GSM) TDMA word. The VBRAAM forward message word 403 is shown having a 50-character message body 404, a nine-character message header 405, and a ten-character message tail 406. The message header instructs the communicator 100 user as to the type of message, such as an alpha-numeric message to be displayed to the user, or an individual message sent from a private caller, or a message sent from another communicator user, or a message sent from a facilitator bearer such as a debit bank center 120, telling the user he needs to update his account and that he has used all of his prepaid credit, and other selected message types. This message is preferably displayed on a liquid crystal display (LCD) 156 seen in FIG. 10. Examples of other types of possible selected messages include VBRAAM debit phone encrypted instructions: (a) for single number access; (b) anti-fraud and anti-cloning instructions; (c) wireless system remote control; (d) sleeper phone control; and (e) global positioning reports. If communicator 100 is also configured as a personnel management tool that includes a fully integrated global positioning receiver (GPS), the VBRAAM forward and reverse messaging methodology may be used to deliver location update commands and other pertinent automatic vehicle location data (VLD).

In another embodiment, communicator 100 may be configured as a personal digital assistant (PDA) which may be provided with PDA keypad 157 as seen in FIGS. 10 and 11, that allows the communicator user to send selected data messages to other communicator users with PDA configured communicators, Internet file transfer points (FTP), individual Internet users, and designated WEB sites. The VBRAAM-PDA user can access the Internet, send messages to other VBRAAM-PDA users, receive electronic mail, purchase products and services and the like. The possibilities are many and varied. Full duplex data message 403, which is a selected data message, may be configured in varius formats such as FSK BCH 10 Kbps word, IS-136 TDMA multi-frame word, GSM TDMA word, and the like. The message header 406, as seen in FIG. 3, indicates how many characters will be in the attached message body 404, for example, 25 characters, 50 characters, and 200 characters, etc. For example, in one scenario the data message may be standardized to a maximum of 200 characters. However, the message body 404 contains only. 50 alpha or numeric characters, and then contains 150 default characters that act as message filler or message content padding. The padding is necessary to maintain a consistent and uniform message body data bit and character count, if message packet standardization is warranted. The message header 406 contains such instruction sets, and informs the MPPC or communicator 100, via a selected reverse control channel 522, as to the type of message.

The H[1] VBRAAM request word 400, in a metered billing and debit type application, preferably contains a four-character, completely variable debit account register and fingerprint number. Digit fields 5 through 8 always contain the debit account register and fingerprint 139. All VBRAAM based registration status event (RSE) packets preferably contain the four-character register, whether or not the RSE packet is metered billing and debit based or not. This number 139 is derived from conventional cellular phone time code generation means. The time code generator in communicator 100 is uniquely configured by software to operate as non-return-to-zero (NRZ) non-volatile register. As such, if communicator 100 loses battery power, or has a power related failure, the current register number position never zeros out, or is erased from memory. Every accrued voice call duration measurement such as milliseconds, seconds, and minutes is recorded, and added to the last count and sent to the MCMS 106 during each and every VBRAAM RSE event. In non-metered billing and debit applications, the four-digit number may function as a unique VBRAAM fingerprint. Even if a registered and operating communicator 100 is cloned, the cloner can never duplicate the exact activity habits of the rightful paying user.

With reference now to FIG. 4, VBRAAM RSE selected data message 423 for AMPS/TACS is shown divided into seven separate 48-bit RECC words. The IS-553 AMPS RECC reverse control channel protocol depicted here allows for up to eight 48-bit words to be transmitted in one burst. If longer text messages are to be sent then multiple, sequential bursts of additional packets may be used, for example in a VBRAAM PDA application. The illustrated VBRAAM multi-word selected data message shown is based upon and resembles a standard origination data packet with enhanced dialing features. This selected data message contains data that is particularly configured for a VBRAAM metered billing and debit application. For example, the A-word 125 contains the station class mark (SCM) "1011" 137 that designates this communicator as a metered billing or debit phone. The CCAD Identification Number (CIN) comprises a seven-digit office and xxxx code 264, and in the B word 126, the three-digit number plan area (NPA) or area code of the CIN are shown 133. Together, this ten-number code comprises the CIN. This number appears similar to a conventional ten-digit directory number. A person dialing this number from another mobile or from a landline phone could not reach the communicator 100 user with the CIN number. The CIN and CSN are used for metered billing and debit identification by the serving MSC and the CCAD MCMS. As previously described, the CIN may also be used for metered billing or debit phone forward "canned" messaging, such as debit account status or increase indicators, roamer charge indicators, or debit packet counts. In word C 127, the CCAD Serial Number (CSN) 136 represents the communicator 100 serial number. The CIN and CSN are used together for registration, origination, and overall unit identification for MSC, SS7 network, and CCAD MCMS data analysis, and VBRAAM message center user identification, current cellular system location, and processing procedures. The D word 131 is preferably a conventionally configured origination packet, with the first word of called address used to send dialed digits entered by a conventional mobile phone user, for example. However, with the VBRAAM method, the D word is designated the application-specific H word one, or H[1] word 131. For communicator 100, metered billing and registration purposes, the H[1] word 131 is sent to the MCMS with the A, B, and C words. The H[1] word may contain other application-specific data that is not manually entered by the user. All CCAD H words are preferably automatically derived via communicator 100 internal firmware and software. The communicator 100 user, when communicator 100 is configured for metered billing and debit application, has no direct control over what is contained in the VBRAAM H word data fields. For example, all data in H[1] 131 is derived with embedded software and hardware automatically applied to create the aforementioned time code generated register/fingerprint 139, and the VBRAAM activator 138. Also preferably included are three digits, two through four, that contain the office code of a number that is part of a two-way paging response. For example, the E word or second word of the called address is designated by the VBRAAM messaging as the H[2] word 132. Depicted in this word are four of the total of ten two-way paging response number in digits one through four 122, termed the XXXX of a seven- to ten-digit directory number. Where normally this word would contain a number to be directly trunked to the PSTN and called by the serving MSC, here this number includes a communicator 100 user's two-way paging pre-determined message number 424, and the number plan area (NPA) or area code 425 of the calling party who paged the communicator user. The third and fourth word of the called address are also designated by the present invention as the H[3] word 123 and the H[4] word 124 respectively. Each word 123 preferably contains application-specific data messages that contain information relevant to global positioning satellite (GPS) information and other location triangulating data, 141, 142, 143 and 160, if the communicator is equipped with an optional GPS receiver. These data fields can be used for all manner of additional debit system security and service related applications. These analog H words and the entire AMPS IS-553 based protocol depicted here is but one example of analog and digital control channel and digital access channel protocols that can be used by the present invention for the purpose of implementing the VBRAAM debit system in the cellular, PCS, and mobile satellite industries.

The data word block format as shown in multiple examples in FIG. 4, is similar to RECC 48-bit control channel words. However, the unique way these words are encoded is quite evident as depicted in FIG. 4. A comparison of the five- and seven-word packets depicted in both FIG. 4 and FIG. 13 reveals a fundamental uniqueness of the present method. If a dual mode communicator user travels into the serving area of an IS-95 or IS-136 CDMA or TDMA compatible system, the AMPS protocol may still be used, for these digital standards still rely upon IS-553 AMPS control channel protocols for complete system access and format compatibility. That is, each dual mode phone including communicator 100 will operate in any D-AMPS serving cellular system. If a D-AMPS configured communicator is configured for IS-553 AMPS and IS-136 TDMA, and its user travels into a serving cellular system that is IS-553 AMPS and IS-95 CDMA, the communicator 100 will have service based on the IS-553 AMPS. The VBRAAM method also works when communicator 100 is configured for IS-553 and IS-95 CDMA based networks, and the user travels into a serving system that is IS-553 and IS-136 TDMA. Regardless of the configured network platform, communicator 100 user can access the currently serving wireless communications network for voice, data, and two-way messaging on the IS-553 portion of the currently serving cellular system analog voice and control channels by utilizing the VBRAAM protocols. Preferably, all VBRAAM communicators 100 are configured for both VBRAAM forward and reverse messaging.

A man-machine interface (MMI) 116, which is preferably a Unix-based computer terminal, is seen in FIG. 2, and is utilized by wireless communications network signaling and switch technicians to enter new data in call handling, number translation, parameter table, data files, etc. Mobile identification number (MIN) data files are preferably used by the MSC to identify systems to which different MIN numbers belong. In the preferred VBRAAM methodology, these files are used in a similar fashion, however, the VBRAAM communicator's CIN is used only for appending IS-41/SS7 specific global, cluster, and node codes so that MSC software knows where to direct the selected data message to the MCMS on a particular SS7 network, such as the NACN. Once the MSC identifies the MCMS's HLR 162 as a bonafide point-of-presence (POP) on the SS7 network, it relays the entire VBRAAM selected data message. Any MSC that operates on an SS7 network is deemed a switch or service point (SP) or service control point (SCP). Therefore, the MSC using the VBRAAM methodology operates as an MSC/SCP that identifies and relays the origination/ registration, or RAAM RSE event packet, to the MCMS 106.

Figure 5:
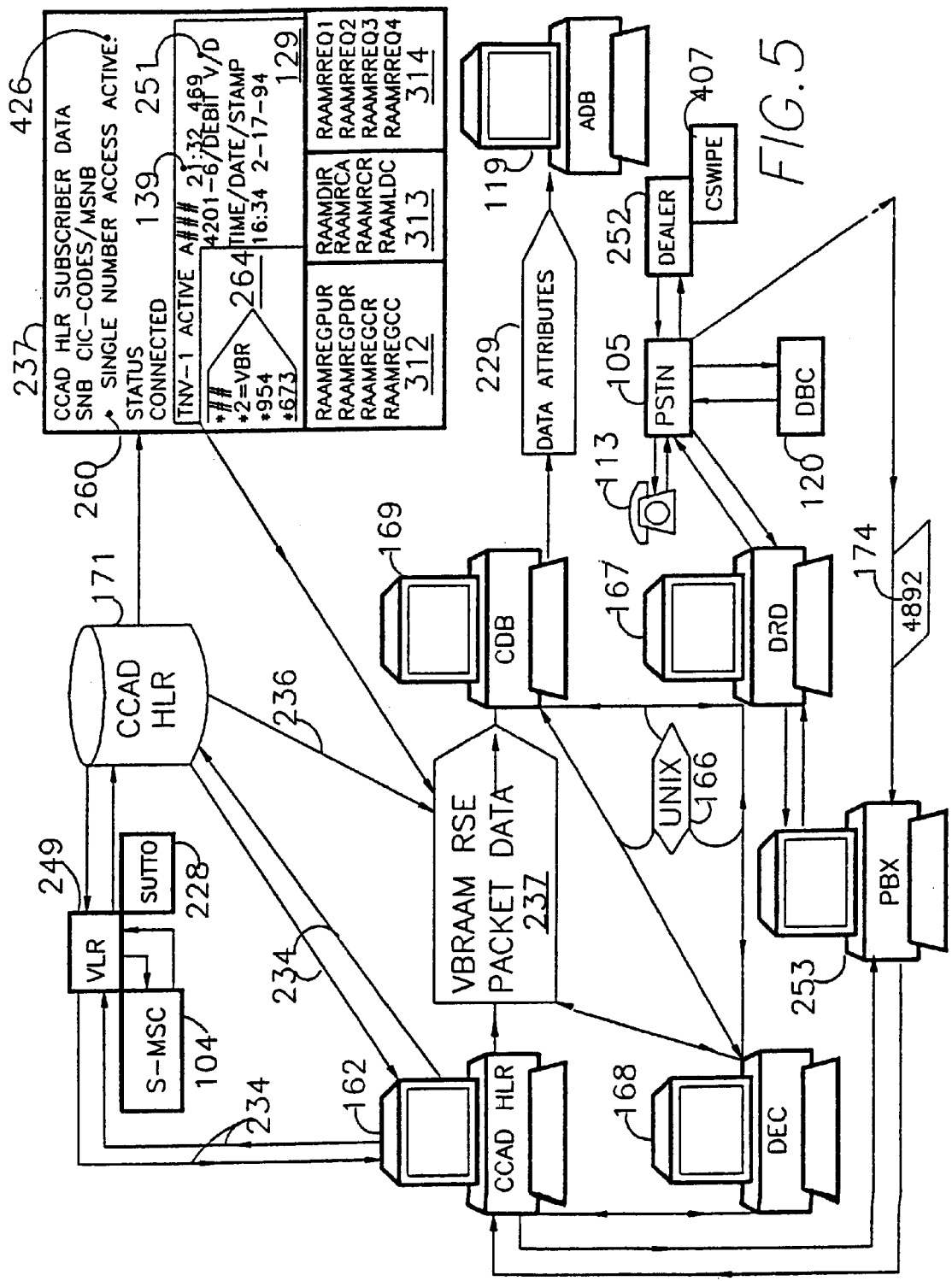
FIG. 5 shows a logic flow diagram of a CCAD-DEBIT master central monitoring station (MCMS) HLR/SCP processing system, according to the invention.

When a VBRAAM RSE selected data message packet arrives, the following procedures preferably occur as seen in FIG. 5. The received VBRAAM data message packet, such as one designated RAAM REG PUR 312, arrives and is converted from SS7/IS-41 packets to a CCAD HLR readout data format 237. Within this readout is CIN 260, for communicator 100, and the time code register/fingerprint digits 139 that make up part of a communicator 100 user's active profile. Preferably, within this profile is also the called number, single number follow referral numbers 426, and the type of service the communicator 100 user has activated, such as both voice and data indicators 251. The time code generated register/fingerprint 139 is also preferably contained within this data string. When the data message packet arrives it is immediately time and date stamped 129. Preferably, each communicator 100 user has an individual usage tracking, user location and velocity file that is constantly updated. Various remote access application message (RAAM) events are categorized, such as RAAM registrations 312, RAAM debit events 313, and RAAM downlink message responses 314. Each data message thus also supports the VBRAAM inherent anti-cloning and anti-fraud aspects. This anti-fraud methodology is important to the wireless communications network, such as cellular, PCS, or mobile satellite, to prevent unauthorized use of their network and to the communicator 100 user from fraudulent use of his or her account. In fact, the disclosed anti-fraud methodology may be used with a variety of CCAD-based voice and data communicators. For example, a two-way pager phone can be configured for the VBRAAM method including the anti-fraud and anti-cloning aspects thereof. In fact, the VBRAAM method, when used for the metered billing and debit applications may, unaltered, supply metered billing algorithms and report to the currently serving cellular or PCS carrier without any infrastructure add-ons or software upgrade requirements. Accordingly, the VBRAAM method, in this embodiment, may be automatically applied for anti-fraud and anti-cloning purposes by simply upgrading the communicator's software, and by utilizing the present invention's MCMS as an on-line anti-fraud checkpoint. The disclosed VBRAAM anti-fraud features may be downloaded to various cellular, PCS, and mobile satellite phones at dealer point-of-sales. Once the MCMS and its unique data management protocols and messaging protocols are incorporated in a participating network, they seamlessly, and in a transparent fashion to conventional operational protocols, provide unique metered billing, debit tracking, anti-fraud, single-number access, and two-way short messaging and other messaging functions described, which may be automatically applied and fully utilized by any participating cellular, PCS, or mobile satellite carrier.

Conventional IS-41 and SS7 system requirements specify that an operating SS7 service control point (SCP), such as an HLR, must be redundant. The disclosed CCAD-MCMS is preferably designated as an HLR/SCP, and therefore two HLRs are provided and have an on-line and a fault-tolerant status. If one HLR fails, then the other one immediately takes over. Accordingly, CCAD MCMS has two HLRs, one co-located at the MCMS 162, and one remotely located at another physical location 171. The remote HLR 171 may be placed in another city or region, as long as it is not located on the same power grid as the co-located HLR 162, so that a local power failure or natural disaster will not cause both HLRs to fail. The decoder terminal 168, or "spy-node," contains data algorithms that continually search for the debit phone packets 237. When the terminal 168 detects a data packet 237, such as a metered billing or debit data packet, it captures it and relays it to the comparative data base (CDB) terminal 169, and looks up the user's current debit limit and compares it with the received information contained within the most recently received data packet 237. If there is enough debit credit remaining, and register/timer received logically matches the last register/timer data received, it allows the CCAD-HLR to automatically initiate a RAAM registration completion and current call approval response, and forwards the proper IS-41 MAP response to the CCAD HLR 162 and 171, and the CCAD HLR relays it to the serving MSC 104 via the SS7 network. The serving MSC allows the voice call to be placed. If the communicator 100 user is requesting two-way paging packet transfer approval contained within the same RAAM packet as the intended response message, the same procedure applies. If the communicator user's debit account has remaining credit for air time and data packet transactions, the two-way paging calling party number 122 seen in FIG. 4, and the message indicator 424 essentially flags the MCMS and instructs the decoder terminal that this is a data message transfer request, and not a request for voice service. If the H[2] word 132 does not contain a message number indicator 424, by showing a readout of "0," then the decoding terminal flags the packet as a voice service request origination/registration voice service request packet (VSRP). If communicator 100 data message packets register/timer data counter fields 129 indicate to the comparative data base (CDB) 169 that all credit has been used, then a service block indicator is relayed to the serving MSC via the CCAD HLR. However, the CDB 169 continually updates its debit account information by constantly interrogating the Debit Bank Center (DBC) 120 every time a debit phone user requests a specified debit increase amount. The CDB 169 preferably interrogates the DBC via the data reception and distribution (DRD) terminal 167. The DRD terminal controls a direct link data frame relay link to the DBC. The DBC may be a bank, credit union, brokerage firm, etc., that can offer cellular, PCS, and mobile satellite debit services as an integral part of normal ATM, or credit card services such as the VISA corporation affinity user or normal registered merchant service program. In this embodiment, the VBRAAM method allows credit card services over the Internet and provides for automatic debit increases directly from the RAAM communicator. This debit limit increase request is automatically entered into the H[2] word digit data fields. No voice channels, operators, or landline calls are needed to request an authenticated and highly secure debit level increase. No debit cards or credit cards are required. The debit phone user simply scrolls through a menu of "canned" debit increase request messages, such as $25.00 increase, $50.00 increase, or $100.00 increase. Once the user finds the desired message amount he enters his four-digit PIN code and presses the send button. The message is automatically sent to the nearest serving base site and MSC. The MSC/SCP automatically relays the VBRAAM packet to the MCMS/HLR/STP and the received selected message and data packet is recognized.

Using VBRAAM methodology, a bank's 154 automatic teller (ATM) system can be integrally tied to the DBC 120. The communicator 100 user, in this embodiment, can simply go to his or her bank, or any ATM that is configured to provide voice and data debit services, and purchase air time and data packet credit. The communicator 100 user's cellular point-of-purchase dealer 252 may be configured to interact directly with the MCMS and act as a debit user data base, via a conventional merchant ATM debit card swipe terminal 407.

Or an automobile dealer 252, for example, may also access communicators user's credit card and ATM accounts, if automatic car payments, for example, are to be made to the dealer. There are many ways to configure these features and of course, they are not limited to the examples given. The MCMS is continually interrogating the DBC 120 in this application so as to receive new debit user account information updates for purposes of providing a trouble-free service, and to protect against misuse and fraud. The constant comparison of date, time stamp, and register/timer information most recently received with previously received information, coupled with continuous DBC interrogation, ensures a secure and efficient system.

For example, in one scenario, a communicator 100 user has just purchased a block of voice service time and data packet transactions, and his or her last access attempt revealed that 21 minutes and 32 seconds of voice service air time has been accrued. However, recent DBC 120 interrogation has just revealed that he or she has purchased another two hours of voice time and 30 additional data or two-way paging transactions. The time stamp applied to the most recently acquired DBC record, compared with previously received origination/registration RSE packet, data and time-date-stamping, and register/timer data, reveals that he has updated his debit account. Therefore, this particular debit phone user's voice time and data transaction register/timer count has to be reset. A preferred resetting procedure is as follows. If communicator 100 is configured for one-way paging and analog AMPS service, the MCMS 106 sends the communicator user's CIN number 260 to the serving MSC 104, and the MSC transmits a page over all base stations 101 connected to it. Contained within this page is the communicator user's CIN number 260. The user's communicator 100 receives this number. Simultaneously, another encrypted message is sent to this same communicator via the serving paging network, or VBRAAM forward data messaging.

The MCMS 106 may transmit messages to communicator 100 that are dual satellite and cellular compatible. The communicator 100 can also receive messages from a mobile satellite, such as the Inmarsat P satellite 114 depicted here, as long as communicator 100 is configured for such use. The MCMS 106 transmits a selected data message via the SS7 network 115 or the PSTN network 110, and the satellite system network center ground station or hub 109 transmits an uplink message, and then the satellite relays and transmits the message to communicator 100.

A unique "caller pays" land-to-mobile call method may be implemented using VBRAAM methodology and communicator 100. In this embodiment, the caller, using a landline telephone 113 in FIG. 2, places a call using a "900" number 153. The 900 number land-to-mobile call is routed to the MCMS 106. The MCMS interrogates the CCAD HLR 162 to determine in which serving cellular, PCS, or mobile satellite network communicator 100 is operating. Every time an MSC sends a origination/registration invoke request to any HLR, including the CCAD HLR, the MSC sends a carrier identification code (CIC) that essentially identifies which serving cellular system is sending the message, and in particular which MSC is sending the origination/registration invoke request. Preferably, every time the MSC sends the origination/registration invoke request, the CIC code is sent in the same IS-41/SS7 packet. The CIC code therefore is equated with a serving system location, represented by the MSC 104.

The MSC 104 preferably pages communicator 100 user by transmitting voice-service-based MIN numbers via the base station, and utilizes the analog FOCC forward control channel, or digital access forward primary or secondary paging channel. Once contacted, the communicator 100 user presses "send" and the call commences. In one application, the caller preferably pays only when communicator 100 user answers the call, so any air time charges are absorbed by the 900- or 800-number charges. Once the call is terminated by the landline caller 113 or the communicator 100 user, no more 900- or 800-number charges are incurred by the caller. The communicator 100 register/timer status has not been affected by this land-to-mobile call. No other calls can be placed to the debit phone user unless the PIN number is entered and the landline caller uses the 900- or 800-number service. Accordingly, this prevents an accidentally dialed CIN number to reach communicator 100. In this embodiment, he CIN is preferably used only for identification, routing, and 900-number call forwarding.

The MSC 104 is preferably communicatively connected to a visitor location register (VLR) 249 as in FIG. 5. The VLR is a data base that is also a service control point (SCP) on an IS-41/SS7 network. The VLR operates in many respects like an HLR. The VLR keeps records of all roaming mobile users actively operating in that particular serving network for a 24-hour period. Each roaming mobile user is assigned a temporary local directory number (TLDN) or pseudo (SUTTO) number, that is stored in, for example, the currently serving cellular system's or MSC's visitor location register (VLR). This number is preferably used if any calls are received at the MSC that are designated as active roamers. When a roaming mobile user first registers in a serving MSC operations area, the home cellular or PCS system's HLR is interrogated in the same manner as heretofore described. If the mobile roamer's electronic serial number (ESN) and the mobile identification number (MIN) is sent to the home system HLR, and if the roamer's data files are present in the HLR and his account is in good standing, the HLR may then transmit a registration acceptance message along with a roamer profile to the serving MSC. The serving MSC then downloads the successful registration, the roamer profile, and assigns the SUTTO number. The VLR duplicates the roamer profile and assigned SUTTO number and then transmits it via the IS-41/SS7 network to the home HLR. Therefore, a current location of all active and registered users may be maintained. When, for example, a land-to-mobile "900" number is dialed by a landline PSTN caller 113, the call is routed to the MCMS HLR 162, 171 via the MCMS automatic integrated voice response (IVR) voice mail-PBX system 253. The caller hears a pre-recorded voice say, for example, "please enter your personal identity number" (PIN) 174. The caller enters the PIN number, and the PBX system 253 interrogates the comparative data base (CDB) 169, checks its own files, and compares the PIN number just received with the all debit phone user PIN numbers stored. Once the PIN number is validated, the CDB 169 sends a PIN acknowledgment invoke, plus the debit phone user's CIN and CSN numbers, to the PBX system 253, which in turn interrogates the CCAD HLR 162, 171, and checks for most recent location and SUTTO number assignment. Once the SUTTO number has been pinpointed, the HLR transmits the SUTTO number and the most recent serving MSC CIC number to the PBX system 253, and essentially routes the call to the serving MSC 104 VLR 249. However this SUTTO number is used only for paging and locating the VBRAAM debit phone user. The VBRAAM HLR 162 also causes a normal MIN page to be initiated for the VBRAAM. The HLR may also interrogate a voice service account if the local carrier has established one to support the voice service side of the communicator 100.

Figure 6:
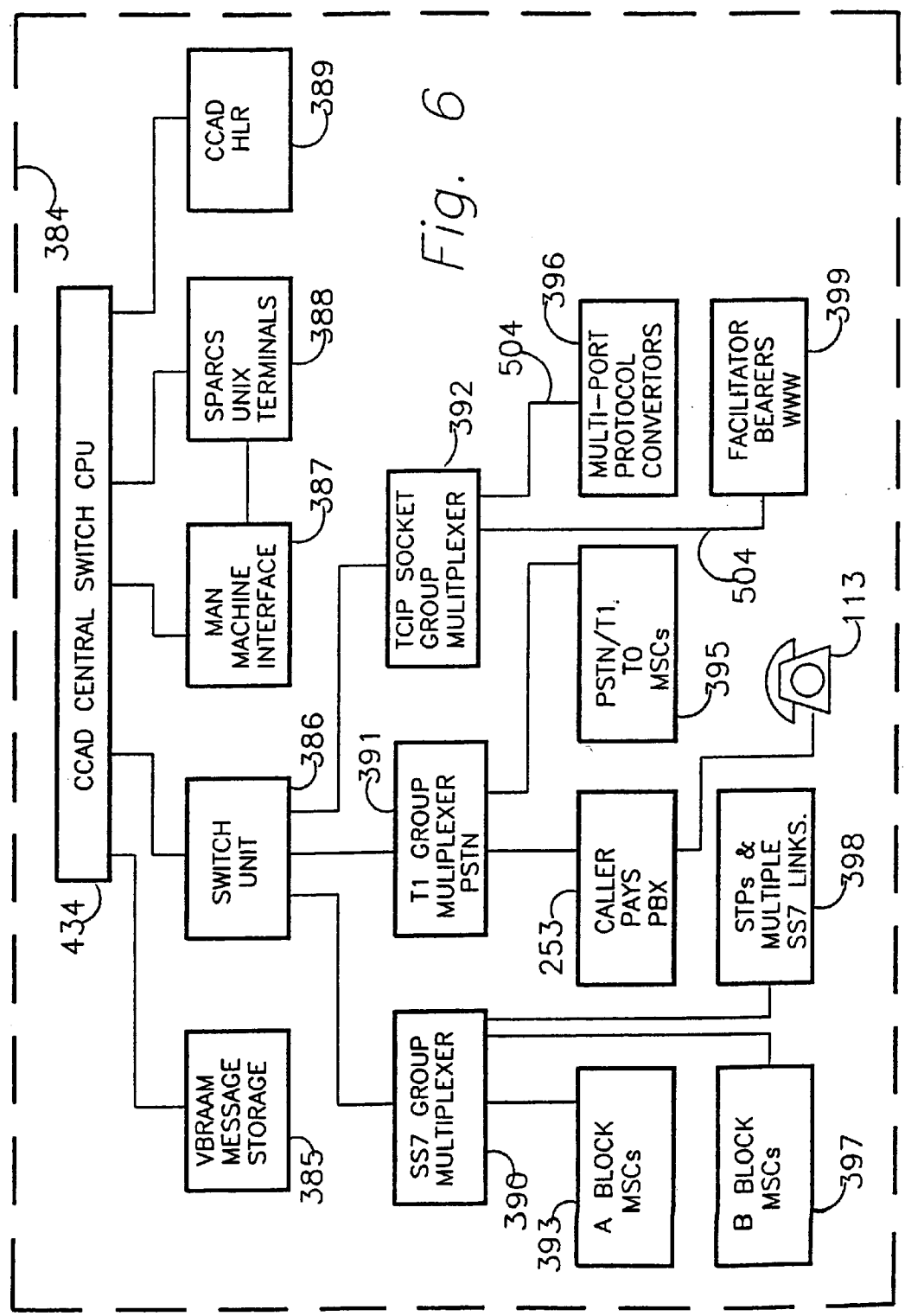
FIG. 6 shows a preferred VBRAAM switch port matrix, according to the invention.

The CCAD multi-protocol central switch 384 is depicted in FIG. 6 and is used in a wide variety of VBRAAM applications. Switch 384, preferably a central processor 434, is communicatively linked to switch unit 386, and to a plurality of man-machine interfaces 387, and related Sparcs Unix terminals 388. In this configuration, the CCAD HLR 389 may be fully accessed and interrogated automatically. The VBRAAM message center in this configuration 385 is co-located and directly managed, as are the SS7 group's multiplexer 390, the T1 group's multiplexer 391, and TCIP socket group multiplexer 392. The TCIP socket multiplexer is preferably configured to interact with all MPPCs 396, and caller-pays PBXs 253 that interact directly with landline callers 113. The TCIP socket multiplexer 392 also is linked and interacts with the facilitator bearers who are points-of-presence on the WWW 399. The T1 group multiplexer 391 manages a high volume of outbound CIN/SUTTO number pages 395. The SS7 group's multiplexer manages the IS-41 message communications from the CCAD-HLR 389 to both A side 393 and B side 397 cellular carriers, as well as data from the multiple SS7 STP links. This unique configuration fully supports a high volume of VBRAAM data message communications and data processing from various wireless communications network elements that require continual protocol conversions.

Figure 7:
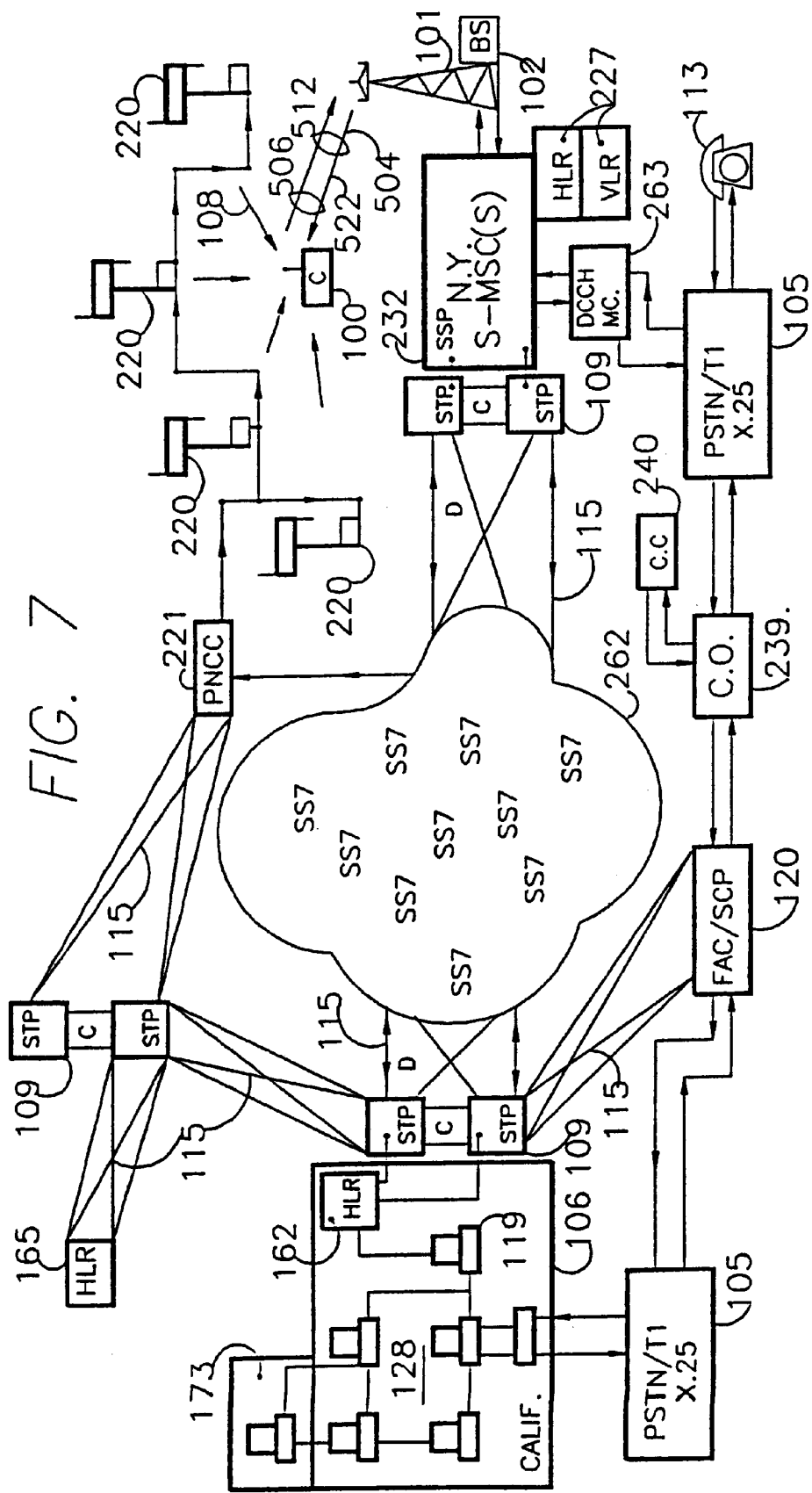
FIG. 7 shows a schematic representation of a communications pathway with a communicator communicatively engaged therewith, according to the invention.

In FIG. 7, a VBRAAM network is depicted configured, in this embodiment, for use with communicator 100 configured for metered billing and debit account applications. If communicator 100 is configured with a broadcast pager receiver, or is configured with DCCH IS-136 forward and reverse messaging capability, a user may receive a selected low-debit account message from the MCMS 106 and its data base terminals 128. When the debit account data base 173 detects a low-debit account balance, it, along with data base terminals 128, prepares a short encrypted message. Once it is prepared, the action data base 119 prepares an SS7 115 or PSTN 105 compatible message. It then interrogates its other data bases to find out if the user is active in any wireless network, such as a cellular network. It checks for recent RSE EVENTS, and it also checks the CCAD-HLR 162 data base tables. If the VBRAAM debit phone/communicator user is inactive, the message is prepared and stored in a message waiting data base that is reserved for each debit phone user. Once registered, the user is deemed active in the participating cellular network, and the broadcast paging message or DCCH message is queued and sent from either an MCMS action data base (ADB) 119, or the DCCH message center 263. If the currently serving cellular provider is equipped with DCCH forward messaging capability, such as the New York City MSC 232 depicted here, and the debit phone/communicator user is deemed active, the ADB 119 determines the location of the user via the CCAD-HLR 162. Within the HLR are carrier identification codes (CIN) and currently serving switch codes as well as SS7 origination point codes (OP) and destination point codes (DPI). With this data, the ADB 119 then identifies the participating paging network that also operates in the same geographic service area (GSA) as the currently serving cellular system. Once this is accomplished, the previously prepared selected data message is sent via the host SS7 network 115 by being pointed to a different signaling transfer point (STP) 109 via the SS7 network, so that it will reach the paging network control center (PNCC) 221, or the DDCH messaging center 263 currently serving the now designated network. Once this is accomplished, the PNCC 221 or DCCH MC 263 then sends the selected data message to the paging network transmission towers 220 located in the same GSA and causes a queued broadcast message to be transmitted to the pager receiver equipped communicator 100, or the message is sent to the co-located MSC 232 and relayed to the specially configured DCCH compatible TDMA forward radio receiver, located at the currently serving cellular base site 101, and then transmitted to the DCCH equipped communicator 100. A similar procedure applies if the communicator 100 is equipped with an Inmarsat P mobile satellite receiver.

In such an application, the MCMS 106 prepares a message for transmission to the satellite network control center (SNCC) 109, via the PSTN 110, utilizing T1/DSO protocols 105 as in FIG. 2. Once received at the SNCC 109, the message is transmitted via a designated uplink satellite frequency channel, and transmitted via downlink to the Inmarsat receiver equipped communicator 100. Once the message is received, a message appears on the communicator 100 LCD display.

A time code generator 304, as seen in FIG. 8, is shown as a conventional "555" type time code generator circuit and is used in metered billing and debit applications, pre-paid paging applications, and two-way messaging using the present method. Time code generator 304 is used to provide time code bits 308. CCAD-VBRAAM software 307 is configured to detect conventional supervisory auditory tone (SAT) 309 being sent on the forward voice or traffic channel when a voice call is initially engaged. The CCAD-VBRAAM central processor unit (CPU) 307 contains CPU CCAD-VBRAAM software 310, that causes the time code generator 304 and its waveform generator 305 to produce a time code wave 306, from an algorithm that continually compiles, and ultimately expresses, an NRZ four-character fingerprint 139. A H[1] RSE word 131 preferably always contains this four-character NRZ register/fingerprint 139. The H[1] VBRAAM data packet count word 405 also contains the NRZ register/fingerprints shown in FIG. 9. In this example, another two fields, digit 3 and digit 4, are used to transmit a received packet count (RXD) 406, and a transmitted packet count (TXD) 407 is added to keep a count of received and transmitted selected data message packets. This feature is particularly important if communicator 100 is equipped with a broadcast pager. The H[1] messaging request word 435 indicates to the HLR/SCP and MC that a user requests not only to receive waiting forward selected data mesages, but also to transmit full text messages to the MPPC via the communicator's 100 assigned reverse voice or traffic channel. Preferably, MSC translation tables are programmed to route the reverse traffic or voice channel from the base site to the MSC and designated trunked pathway to the MPPC.

Communicator 100 is shown in FIG. 10, according to a preferred embodiment, and includes a speaker 158, communicatively linked to a microphone 159 and to a liquid crystal display (LCD) screen 156. Menu keys 175 and set button 176 are also shown in operable relationship to one another. In operation and use, keypad 164 is preferably used only for dialing landline telephone numbers or another mobile numbers. Menu keys 176 are pressed to scroll through and find pre-determined or "canned" message responses for the communicator's two-way paging response feature. Once the desired two-way paging response, or VBRAAM forward or reverse selected message, is determined, the desired message response is located in the menu selection and concurrently displayed on the LCD screen 156, the set button 176 is pressed, then the send button 177 is pressed. This procedure causes any user-originated VBRAAM RSE or VBRAAM selected data message to be transmitted in the heretofore described manner. An optional personal digital assistant (PDA) keypad 157, in FIG. 11, is shown communicatively linked to communicator 100.

Figure 21:
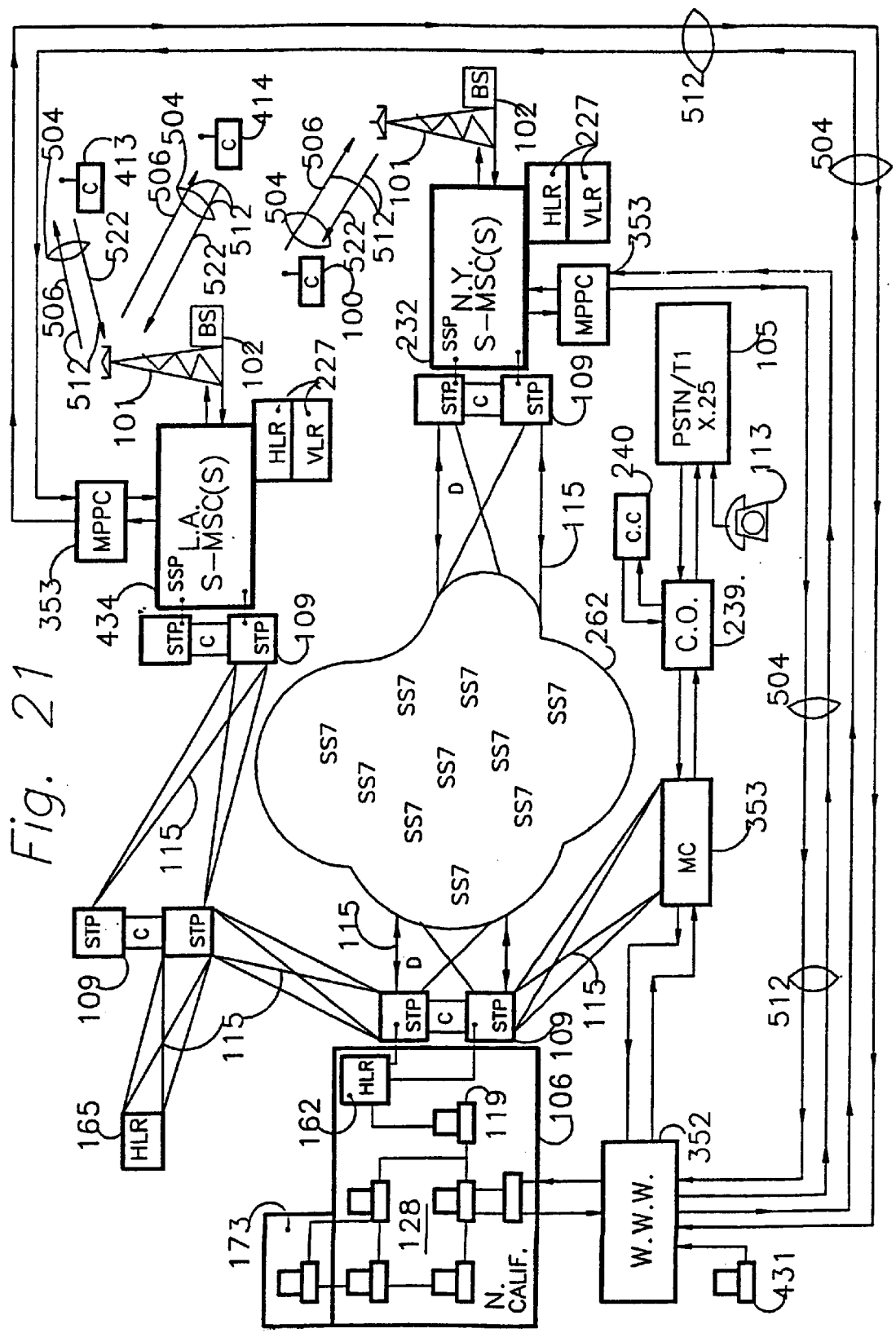
FIG. 21 is a schematic illustration showing a preferred VBRAAM two-way messaging pathway, according to the invention.

The VBRAAM method and associated CCAD-VBRAAM methods for two-way messaging can support user group messaging, user group broadcast messaging, point-to-point, and point-to-omen point communications, as in FIGS. 12 and 21. For example, a VBRAAM communicator 100 user operating in a New York City cellular market, represented here by the New York MSC 232, may send a predetermined message by simply scrolling his menu-based message selection, selecting for "group message." Next, the user presses the set button and manually enters his or her PIN number 118, as in FIG. 12, and presses the send button. Including the PIN insures a secure and authorized VBRAAM user group point-to-omen point request. Additionally, because of the PIN number there is no ambiguity as to who authorized the user group message. The selected message is then sent in the heretofore described manner. Users of group messaging may be a particular business entity which purchases a quantify of communicators, such as business entities operating in the Los Angeles, California cellular market, represented here by the Los Angeles MSC 434. An account may be set up so that any one business user in a designated group may send point-to-omni point messaging to other users in that group. Regardless of who is sending the message, such as the communicator 100 user in L.A., the receiving communicator 100 users in New York, 432 will receive their messages via the heretofore mentioned VBRAAM forward or reverse messaging. Additionally, a user group's business center may send a point-to-omni point message to all users. For example, a business center operator, utilizing an Internet-based PC terminal 431, can send a VBRAAM forward or reverse message to the communicator 100 users operating in New York and in the L.A. cellular market, designated 413 and 414 respectively. An example of a complete VBRAAM RSE full-duplex selected data message request packet is shown in FIG. 12 where H[2] word 416 digit one status field may contain the numbers 1 to 6, for example, where each number indicates the type of full-duplex selected data message to be sent from communicator 100. For example, a DATA message equals number 1 placed in digit data field one, FAX documents or message equals number 3 placed in digit data field one, e-mail documents or message equals number 4 placed in digit data field number one, two-way paging response data message equals number 4 placed in digit data field one, or any other selected data message may be encoded. Thus, the H[1] word 415, and the H[2] word 416 in are uniquely encoded to selected data messaging requests such as group messaging requests and other full-duplex selected data messaging events. For example, the indicator symbols 411, that are present under the digit number data fields are preferably interpreted as follows. Under digit three data field space of H[1] word 415 are the symbols "INCM" and "OTGM" which are interpreted in the RSE EVENT legend 410. INCM represents an incoming messaging. This particular reverse selected data message being sent as result of a MC initiated CIN page. The symbol "OTGM" is interpreted as an outgoing message as seen in the RSE EVENT legend 410. The INCM symbol is equal to a number 1, which in this example the H[1] word 415 is digit number 3 data field. If it was an incoming message, the digit number would be set to 1 for digit number 3 data field. In the H[2] word 416, the "MSG" symbol indicator 411 relates to the type of message the communicator 100 group user is sending. The RSE EVENT legend 410 reveals that the message is a user group data message that is to be sent to the predetermined number of users so designated in that business user group. A number 4 is therefore placed in the digit number 4 data field of the H[2] word 416. Digit field one contains a number 4 that further indicates that this selected data message is a full-duplex e-mail message that is to be sent to a particular e-mail address. In this example, the "EM" symbol placed under the digit one field within the indicator 411 represents e-mail.

A dialed digit origination packet of the VBRAAM methodology is depicted 430 in FIG. 13. Preferably, the B word 421 contains the order qualifier code 134, and the order code 135. When the base site and MSC receives the origination packet, and the user is authenticated, a forward and/or reverse voice channel is assigned at the currently serving base site, and a voice path is trunked to the called or calling party via the MSC and PSTN. When a remote feature control operation is dialed, and the user presses the send button of communicator 100, a conventional origination packet 430 is transmitted to the currently serving base site via reverse control channels and forwarded to the MSC. Since this remote feature control operation request is contained in an origination packet, and because the contained order codes cause the base site to assign forward and reverse voice channels, this operation is broadly deemed, for example in a cellular network, a cellular voice service call. However, because the MSC detects a remote feature control request, by analyzing the dialed digits with translation table software and firmware, this origination event is deemed not a true voice call. The dialed digit stream is sent via the SS7 network along with a IS-41 remote feature control request invoke to a mobile subscriber's home system HLR. Once the home system HLR receives the invoke message, the HLR instruction contained in the dialed digit stream is performed, and the home system HLR sends an IS-41 remote feature control operation result message back to the currently serving MSC. The forward voice channel preferably remains assigned in reserve until the MSC receives the IS-41 result message from the home system HLR via the SS7 network. Next, the translation tables route the reserved forward or reverse voice channels to a stutter tone signaling unit, or a pre-recorded voice message box such as an integrated voice response data base. The stutter tone or voice recording is routed and then transmitted to the mobile subscriber, and the remote feature control operation is essentially concluded. When the forward or reverse voice channel is routed, it remains so for about three to eleven seconds, depending on how the translation tables are set by the cellular switch and network technicians, or other host wireless communications network technicians. Like many call procedures, the remote feature control operation may be set up in various classes of service. One class of service, for example, might allow the mobile cellular subscriber to dial *741 plus a ten-digit directory number that he or she wishes all land-to-mobile calls to be routed to, when the communicator or cellular phone and is no longer active on the network. This instruction is then sent to his or her home system HLR by the currently serving MSC via the SS7 network, in the heretofore described procedure. Also, when a new class of remote feature control operation is set up in the MSC's translation tables call routing instructions are then entered. The technician enters a group of 10,000 ten-digit directory numbers, such as 175-421-1551, and attributes these numbers to the new class of service which is being configured, and then enters the remote feature control operation activator; such as *741, or * plus any number combination. In addition, the technician may determine which auditory response system the FVC should be routed to such as a stutter tone generator, or a IVR voice box that is connected to a conventional designated MSC switch voice path. The disclosed RAAM class of services are preferably set up in the same manner, as is the VBRAAM class of services which would typically be deemed a new class of the remote feature control operation service. However, one of the major differences when utilizing the RAAM or VBRAAM methodology is that instead of setting the translation tables to route the RAAM or VBRAAM class of service to a stutter tone generator or an IVR, the technician sets the translation tables to route the assigned and reserved forward voice channel and voice path to the (MPPC) terminal. Under current network operation standards for up to 11 seconds the VBRAAM and RAAM methodology allows the MPPC to forward and transmit selected data messages as described. These selected data messages can contain data, text, alpha-numeric and encrypted messaging data. This forward and reverse messaging of such selected data messages can be transmitted to and recognized as described by communicator 100, and other VBRAAM compatible communicators. The VBRAAM method, when combined with the aforementioned reverse control channel application-specific RAAM messaging procedure, creates a new paradigm in cellular, PCS and mobile satellite two-way data communications. Accordingly, the VBRAAM method can used for wide variety of two-way data messaging applications, such as paging, text transfer, metered billing and debit applications, control for remote stationary devices and mobile devices, and other applications as described or obvious from the description. The VBRAAM method can be applied to any host cellular, PCS, and mobile satellite network without expensive network infrastructure add-ons, and requires no MSC or SS7 network software upgrades. The VBRAAM method operates transparently, and in effect is an invisible upgrade to any cellular network.

Figure 14:
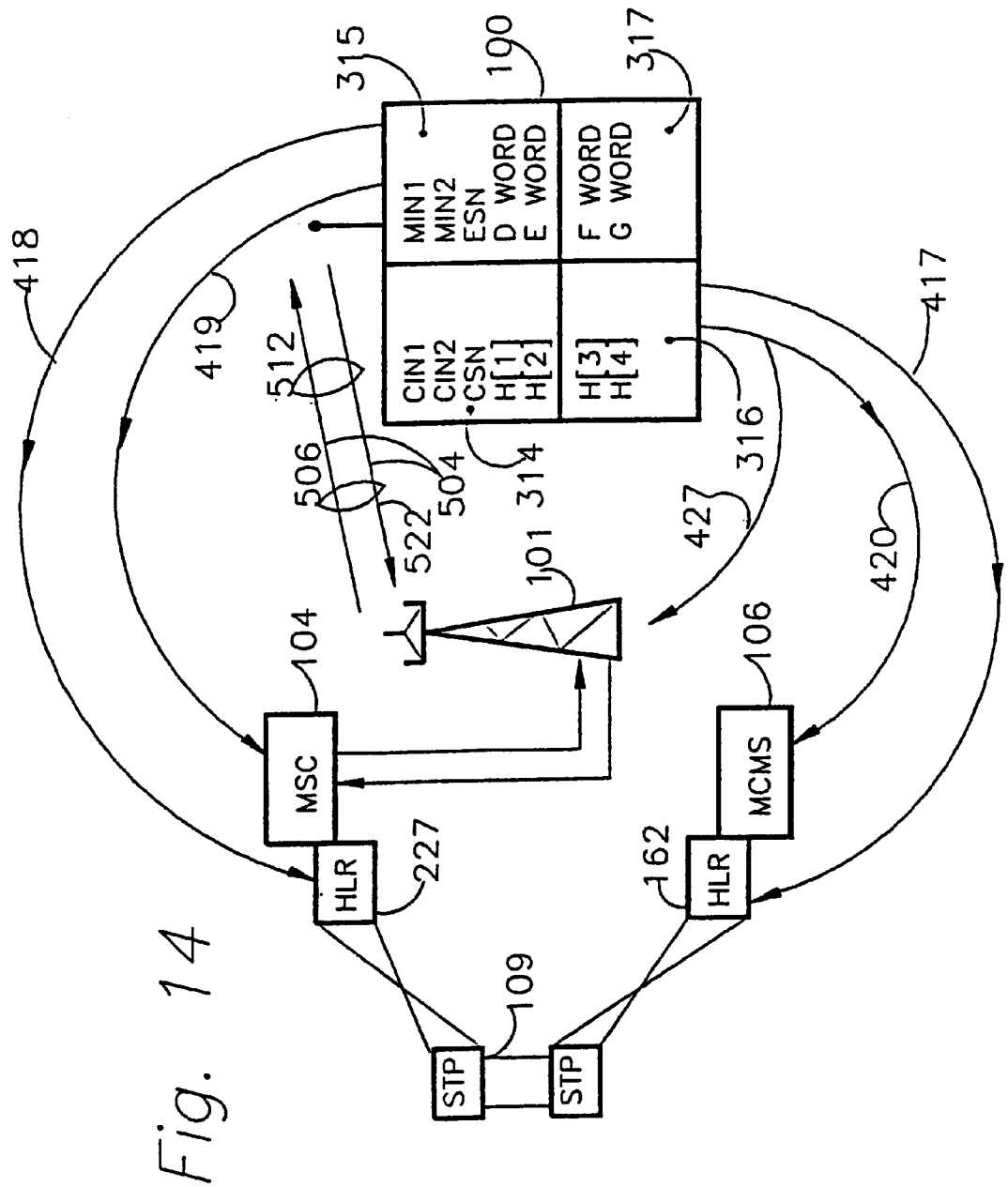
FIG. 14 shows an embodiment of a simultaneous dual access methodology of the communicator, according to the invention.

In reference now to FIG. 14, the dual personality aspects of communicator 100 are shown. A conventional cellular base site 101, in this example, is the initial access point for communicator 100 operational personalities. However, other wireless communication networks may also be read into this example. The CIN/CSN data messaging and data management side 314 operates, communicates, and governs itself and the MIN/ESN voice service side 315 of communicator 100, preferably as follows. The VBRAAM method utilizes six fundamental registration status events (RSE): (1) Power Up Registration Status Event (PUR), as in FIG. 15; (2) Call Request Registration Status Event (CR), as in FIG. 16; (3) Call Completion Registration Status Event (CC), as in 17; (4) Debit Increase Request Registration Status Event (DIR), as in FIG. 18; (5) Variable Burst Remote Access Application Message for Messaging retrieval Registration Status Event (VBR), as in FIG. 12; and (6) Power Down Registration Status Event (PDR), as in FIG. 19.

The VBRAAM selected data message may also contain power up registration (PUR) indicators with register timer digits, power down registration (PDR) indicators with register timer digits, call request (CR) indicators with register timer digits, call completion (CC) indicators with register timer digits, roamer call authorization (RCA) indicators, roamer call rejection (RCR) indicators, debit amount increases (DA) indicators with the four-digit PIN digits and register timer digits, data transaction count (DTC) increase request indicators with register timer digits and PIN digits, and other selected data messaging data.

Figure 15:
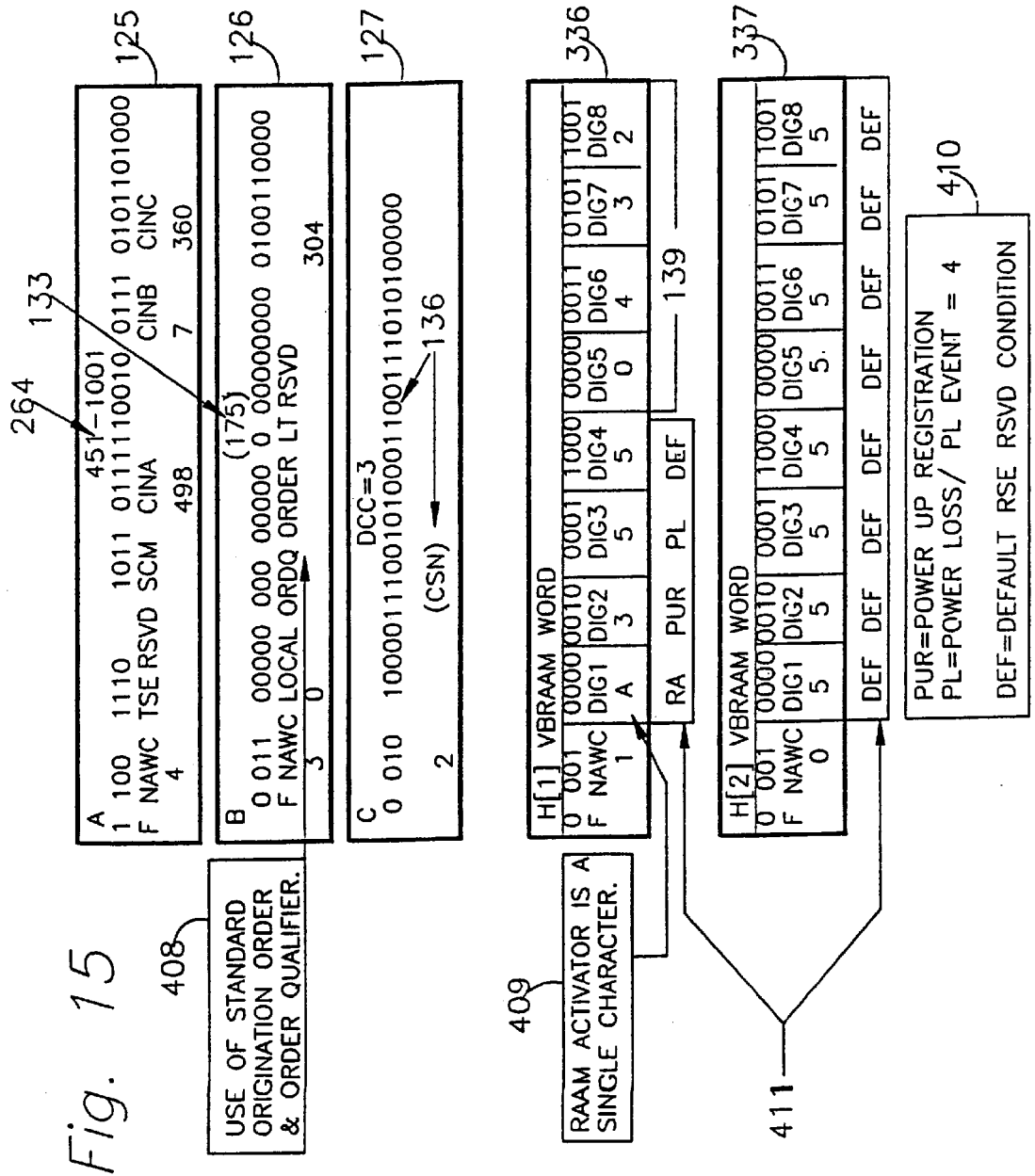
FIG. 15 shows a example of a power up registration and registration status event multi-word RAAM messaging packet, according to the invention.

Upon activation of the power up function of the CIN/CSN functionality or side 314 of communicator 100, communicator 100 preferably then scans for busy idle status (BIS) of the combined paging and access control channel of, for example, a cellular network's base site 101, as in FIGS. 14 and 15. Typically, cellular base sites have one to three designated control channels out the 21 assigned to either the A or B side of Federal Communications Commissions (FCC) assigned cellular frequency blocks, for a total of 42 control channels. Since cellular is fundamentally designed around assigned frequency reuse and effective irradiated power footprint patterns called cells, each cell site is assigned groups of voice or traffic channel frequencies and control channel frequencies. These assigned frequencies are repeated at least seven times in a given cellular network that operates three to four hundred bases sites. However, base sites adjacent to one another do not use the same frequencies as the neighboring base, for this arrangement would cause a network failure.

The CIN/CSN side of communicator 100, after scanning and finding an idle control channel, preferably bursts or transmits the five-word PUR RSE as in FIG. 15. The A word 125 and B word 126 together contain a uniquely assigned ten-digit CCAD Identification Number (CIN), 264 and 133 respectively. The C word 127 contains the uniquely coded 32 bit CCAD Serial Number (CSN) 136. The B word 126 contains the conventional order and order qualifier, 000 and 0000 respectively. These codes are an IS-553 standard code 408. The H[1] PUR RSE word 336 contains a unique single RAAM activator 409. Digits 5 through 8 contain the standard four-digit time code generated register fingerprint 139, as do all RSE events. The H[2] word 337 contains eight dialed digit fields that contain automatically derived and uniquely encoded data. Below the H[1] word 336, and the H[2] word 337 are groups of acronyms 411. Each acronym is described is the RSE legend 410. It is such configured data, such as the selected data message contained in a dialed digit field of the H[1] and H[2] RSE words, how it is derived and produced, and how each digit is interpreted in communicator 100, the MCMS, and HLR/SCP data bases as described, that characterize the present disclosed methodology and apparatus.

The attribute that differentiates one RSE status or request event from another, is the data contained in each H word, as in FIGS. 12, 15, 16, 17, 18, and 19. Preferably, each representative A, B and C word are identical, as are the H word data block formats. It is the unique data encoding that defines the significance of each word, and thus allows for the particular characteristics of the selected data message. Each RSE EVENT is an action event in that when the RSE EVENT packet arrives at the MCMS and HLR/SCP a response action is programmed to occur. Such action events may range from an update of communicator 100 status to causing a distant event to transpire in some data base in a remote area in a distant part of the world. A single arranged four-bit digit can trigger an event via such data message that effects a group of data bases of other communicators 100 on another continent. For example, in FIG. 15, the acronyms listed under each H word 411 represent the following. "RA" listed under digit 1 with the A placed in this data field being a RAAM RSE event activator RA, as described in the RSE EVENT legend 410. "PUR" listed under digit 2 with a number 3 placed in this particular data field indicates to the MCMS and HLR/SCP that this particular data message is a PUR RSE event, as listed in the RSE EVENT legend 410. The four-bit data field under digit five is set at default "5." In the VBRAAM method the number "5," for example, may, in any data field that is designated an RSE EVENT indicator, relate to a default, non-action event. Another word's number "5" in any of the data spaces that are designated event indicators, however, does not cause any resultant action to be taken when the VBRAAM RSE event data message arrives at the MCMS and HLR/SCP data management terminals and data bases. For example, in the H[2] word 337 shown in FIG. 15, as part of the PUR RSE EVENT, all eight data field spaces and event indicators may instruct that this H[2] word for this event does not cause any resultant action to be taken when the data message arrives at the MCMS and HLR/SCP. For this event the H[2] word 337 contains no relevant action indicators. In the H[1] word 336, for example, when the digit 2 data space contains a 3, this indicates to the MCMS and HLR/SCP that this particular communicator 100 user is powered up, is now active on the designated cellular, PCS, or mobile satellite network, and automatically and transparently requesting authentication thereby. Further, in the digit 3 data field space, if communicator 100 is powering up as a result of a power loss, such as a dead battery, this field could contain a number 3 digit as indicated in the RSE EVENT legend 410 to convey such event. In this PUR RSE EVENT digit 3 data field is set to number "5," which may represent a default non action event indicator and digit 4 is shown containing a default (DEF) non-event indicator.

When the PUR RSE EVENT arrives at the MCMS HLR/SCP, it preferably causes the HLR/SCP to respond to the currently serving MSC's registration invoke and remote feature access operation's request with a standard IS-41/SS7-compatible response. The disclosed methodology does not alter the dozen or so automatic roaming messages exploited for message transmission. Such automatic roaming events as Qualification Request, Qualification Directive, Registration Notification, Registration Cancellation, Location Request, Routing Request, Remote Feature Control Request, Service Profile Request, Service Profile Directive, Transfer To Number Request, CSS Inactive, Redirection Request, and Call Data Request may thus all uniquely be used and manipulated by the present method. The VBRAAM method utilizes such IS-41 automatic roaming events in a transparent manner, and when the MCMS and specially designed HLR/SCP receives and responds to a selected data message it "looks" from the perspective of the wireless communications network as conventional and normal activity when, in fact, data messages have been communicated as described. Accordingly, capacity, performance, and functionality of the host wireless communications network is dramatically increased.

Figure 16:
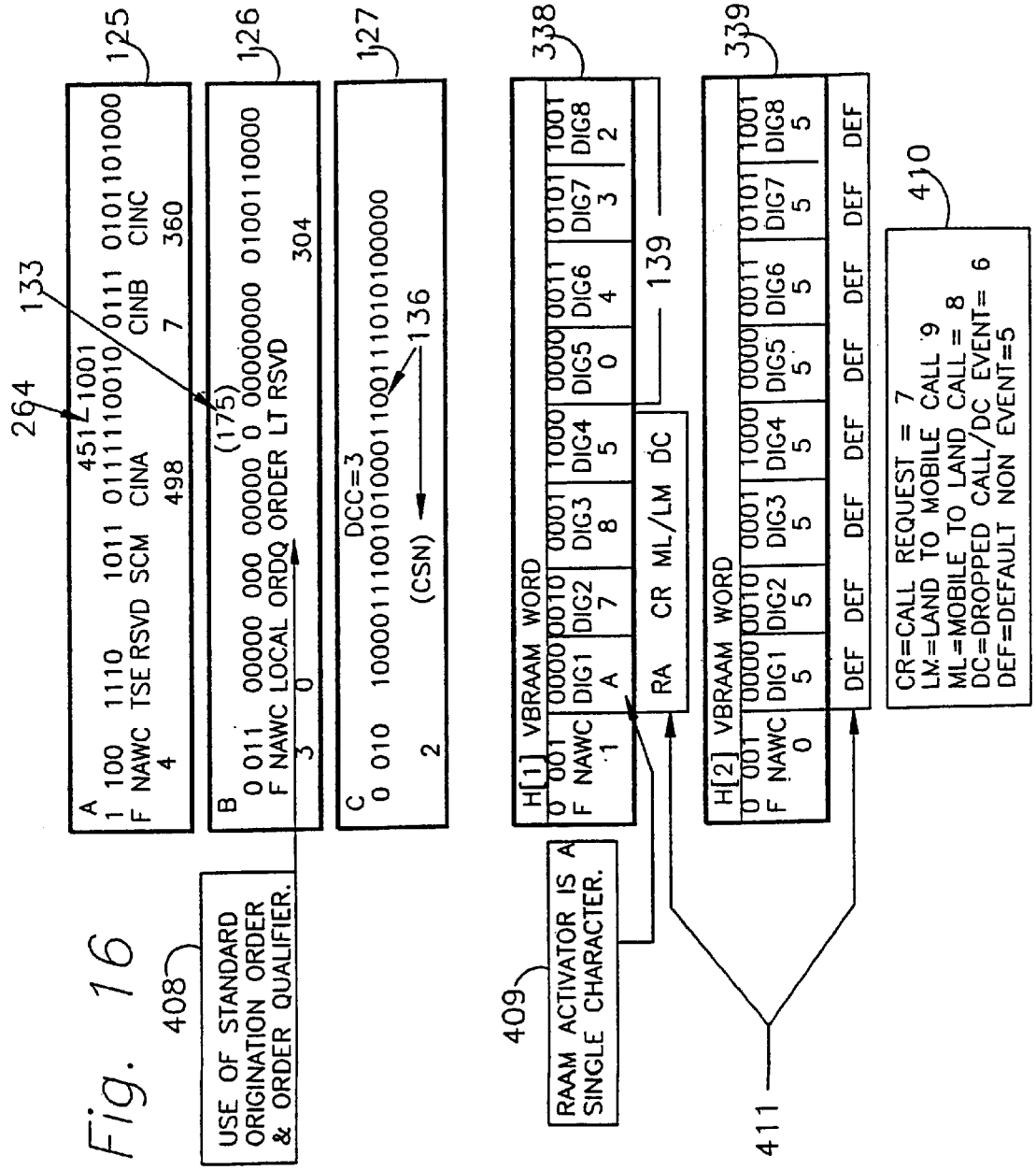
FIG. 16 shows a call request registration status event multi-word remote access application message (RAAM) event, according to the invention.

In FIG. 16, a voice service Call Request Registration Status Event (CR) is shown according to the preferred embodiment of the invention. The A, B, and C words are typically not altered from one RSE EVENT to another. Additionally, for five of the six previously named events the RAAM activator 409 preferably does not change either. However, the CR event H[1] word 338 preferably contains data field designations that are unique to this particular event. For example, the data field for digit 2 contains a number 7, the acronym below the digit CR stands for Call Request as indicated in the RSE EVENT legend 410. For example, when communicator 100 user dials a set-up number in the dialed digit spaces contained in the D and E word of the conventional MIN/ESN functionality or side of communicator 100 and presses send, the Call Request RSE packet is transmitted first. The CIN/CSN functionality or side transmits its data message 427 to the base site 101. The message is then relayed to the currently serving MSC 104, and then processed and relayed 420 to the MCMS 106 and concurrently relayed 417 to the CCAD HLR/SCP 162, as in FIG. 14. The MCMS then preferably examines the time code generated register fingerprint 139, compares it against stored records and the most recent received RSE event, and responds to the serving MSC 104 with a standard IS-41 automatic roaming authorization response. The CIN/CSN side of communicator 100 allows the MIN/ESN side of the debit phone to register successfully, and also to request and place a voice call under conventional IS-553 and IS-41 specifications. If for example, the communicator 100 user has used up previously purchased airtime allotment, then the call request is denied and a standard non-authorization message is sent from the MCMS to the currently serving MSC. The currently serving MSC blocks any further voice service request until the MCMS and CCAD-HLR/SCP sends an authorization message upon the communicator 100 user's next Call Request attempt.

The H[1] word 338 preferably also contains a mobile-to-land call (ML) indicator, and a land-to-mobile (LM) digit indicator 411, as seen in the RSE EVENT legend 410. For example, the ML indicator is always a number 8 in digit field 3 when a mobile-to-land call is being placed. The LM indicator is always a 9 in digit field 3 when a land-to-mobile call is being accepted. If a land-to-mobile caller is calling a communicator 100 user in a metered billing and debit application, and communicator 100 has been reset after a new debit increase request update, communicator 100 will accept the call. If communicator 100 has not been reset by internal software, and the user debit account has not been replenished, the call will not be accepted. The LM and ML indicators are important for data record and user profile statistics. These indicators are also useful if the communicator 100 user has some call restrictions set forth by the network providing voice services. The H[2] word 339 also has another indicator 411, symbolized as DC. DC is shown as a dropped call symbol that equals digit number 8 as shown in the RSE EVENT legend 410. In this instance the DC indicator resides under the Digit 4 data field space. A dropped call occurs quite frequently to mobile telephones, especially while traveling in a motor vehicle. The base site and mobile user typically will lose radio frequency link, and the mobile user will have to place another call to resume the conversation that was taking place. If a dropped call occurs, the next Call Request EVENT will have digit number 6 in the digit space 4, so that the debit phone user will not be charged for the previous air time. Of course, the particular protocol chosen will depend on the particular network.

A Call Completion Registration Status Event is shown in FIG. 17, according to a preferred embodiment of the invention. The difference between this event and the previously described Call Request RSE EVENT is the CC indicator symbol expressed in the RSE EVENT legend 410, and the indicators 411, listed under H[1] word 340. All digit fields in the H[2] word 341 preferably are set to default 5 for a non-event status. A Call Completion event, in this example, is a number 8 placed in the digit 2 data space field. This event indicates to the MCMS and HLR/SCP that the previous call request resulted in a successfully placed and completed call. The time coded register timer-fingerprint 340 is then examined and the data message is then expressed in programmed response in communicator 100.

An example of a metered billing and debit application Debit Increase Request Registration Status Event (DIR RSE) is shown in FIG. 18. The H[1] word 340 is preferably almost identical to the other H[1] word RSE EVENTS where digit 2 data field space has a DIR symbol as indicator 411 located under its position. The DIR symbol corresponds to the Debit Increase Request (DIR) event and is a 9 as shown in the RSE EVENT legend 410. When communicator 100 user's account has been depleted of credit, he or she must request a debit account increase. However, when his account is near depletion, in order to provide trouble-free service, the MCMS directs a CIN page to be sent to communicator 100 via the PSTN network, or alternatively a message to be sent via a broadcast paging network, or a message sent via a mobile satellite network, or a message sent via an IS-136 Digital Control Channel (DCCH) compatible network and/or the VBRAAM forward or reverse messaging via the currently serving MSC and the host network, and either selected digital or analog format configuration.

In FIG. 18, the communicator 100 display 156 may indicate a selected data message to the communicator user. Once a message is received, the communicator user may press the menu scroll keys 175, choose a selected return message, presses the set button 176, and then press the send button 177. Here H[1] word 342 contains the four time coded register/fingerprint NRZ characters located in digits data fields five through eight 139. The H[2] word's 343 data encoding is preferably significantly different from the other RSE EVENT based H[2] words. While digit data fields one through three are set to default DEF number "5," as indicated by the indicators 411, digit data field four contains DIR RSE message number. The indicator legends 410 and 411 contain the symbolic interpretation of each DIR increase message request. For example, selected data message MSG EVENT 2 equals a $25.00 debit account increase, MSG EVENT 3 equals a $75.00 increase, and MSG EVENT 4 equals a $100.00 increase. In the instant example, communicator 100 user has selected MSG EVENT 3. Positioned in digit data field number four the H[2] word 343 indicates to the MCMS when received a selected data message has been received, for example, that communicator 100 user wants to purchase $75.00 worth of air time. Once a DIR increase message request is selected communicator 100 user may manually enter a four-digit personal identification number (PIN) number via keypad 164 as in FIG. 10, and the H[2] word's 343 PIN number digit data field spaces, five through eight 118 are set with communicator 100 user's unique PIN number, as in FIG. 18. Once this operation is completed the communicator 100 user presses the send button, and in a few seconds his or her debit account will be updated, enabling additional voice service calls to be made.

Figure 19:
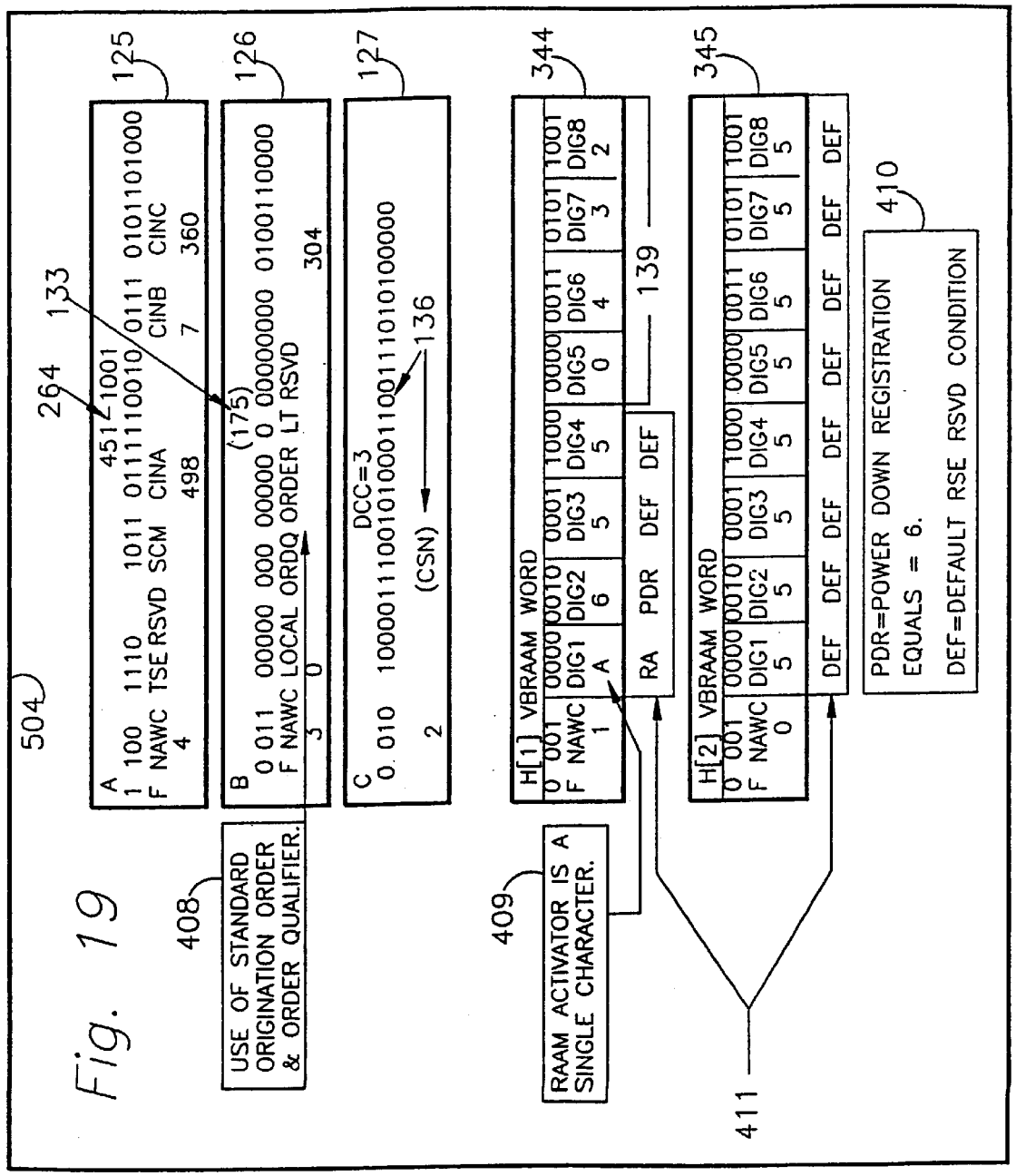
FIG. 19 shows a power-down registration status event multi-word packet RAAM event, according to the invention.

Preferably, communicator 100 is programmed so that when a user turns communicator 100 off, the communicator 100 transmits a selected data message such as an RSE EVENT as seen in FIG. 19. In this example, H[1] word 344 has the data symbol indicator 411 "PDR" placed under the digit number 2 data field. The PDR symbol is interpreted as Power Down Registration as indicated in the RSE EVENT legend 410 and here is designated to the number 6. A number 6 is therefore placed in the digit number 2 data field space of the H[1] word 344, PDR RSE EVENT. When the CCAD-HLR/SCP and MCMS receives the selected data message in the heretofore described manner, the communicator 100 user is deemed "off the network." All incoming messages are then preferably stored at the MC 353 until the MCMS 106 and CCAD-HLR/SCP 162 receive the selected data message signifying power up registration, designated herein as the PUR RSE EVENT.

Figure 20:
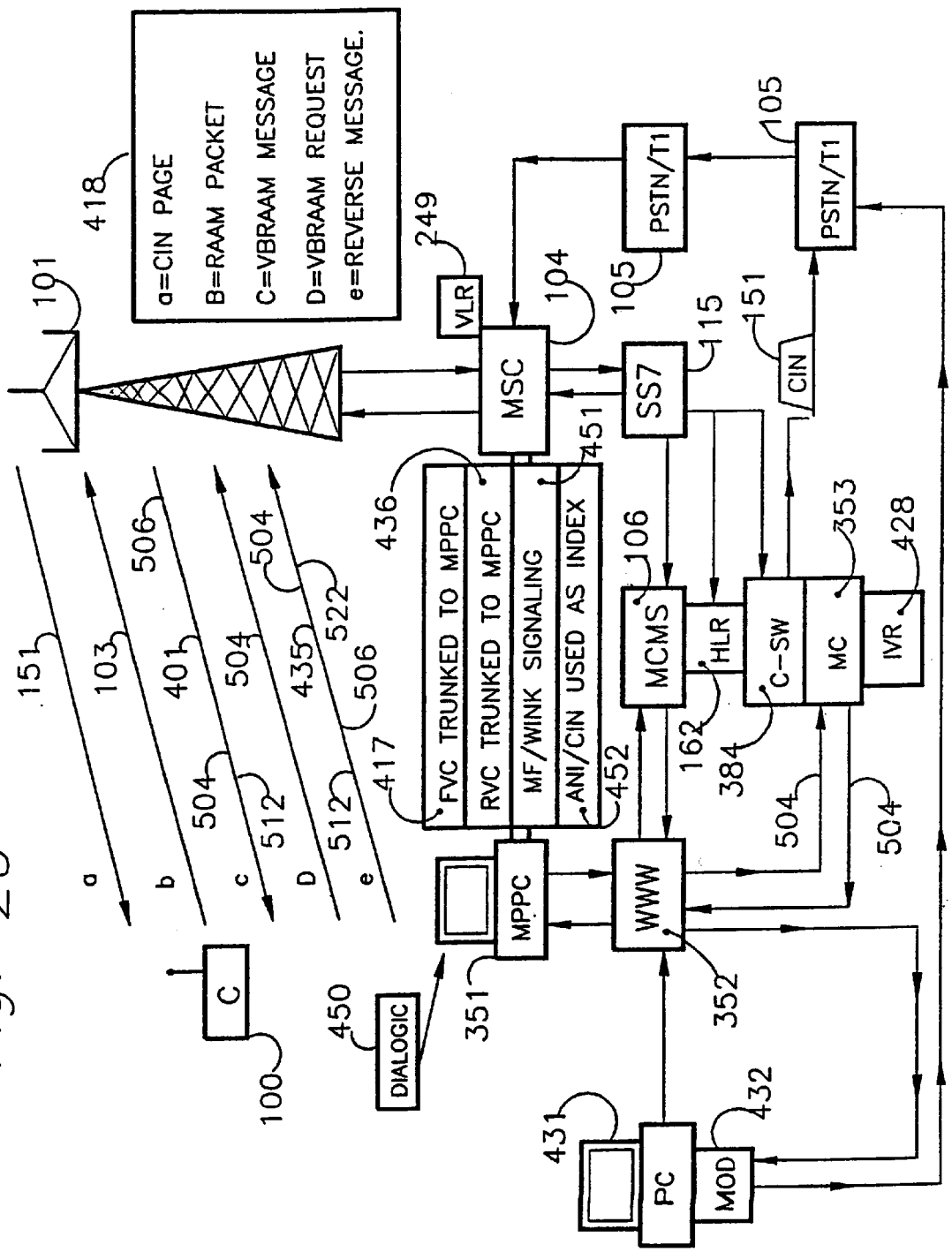
FIG. 20 is a schematic illustration showing a VBRAAM forward and reverse messaging event, according to the invention.

The CCAD central switch 384 is preferably connected both physically and logically to one or more MSC 104 configured for applying the VBRAAM methodology via PSTN T1/DSO protocols 105, as in FIG. 20. The CCAD central switch 384 is also preferably connected both physically and logically connected to the host SS7 network 115. In this example, communicator 100 user has previously signed up, for example, for VBRAAM metered billing and debit forward and reverse messaging. This communicator 100 user may receive selected data messages from such people as his employer and co-workers, for example, via a PC 431, operably connected to the WWW 352, or to the PSTN via T1/105, or to a dial-up modem 432. A coworker sends a 90-character e-mail message, for example, to communicator 100 user via a PC 431, to MC 353. MC 353 immediately stores the message and then sends a message waiting indicator (MWI) to the MCMS 106 via the CCAD-central switch 384. The switch in turn sends the MWI to the MCMS data base terminals, which prepare and send a CIN page 151 to the communicator 100 user in the previously described manner. When communicator 100 receives the selected data message, such as a page, it immediately transmits a VBRAAM selected data message activation packet as in FIG. 12. The H[1] word 415 preferably includes a dual-character VBRAAM activator 433. The two-character activator distinguishes this selected data message from other RSE EVENT selected data messages. When the MSC 104 receives this selected data message packet, the reserved forward or reverse voice channel is automatically assigned, and the switch voice path links communicator 100 to the MPPC 351. The selected data message packet is relayed to the HLR 162 which is configured to process the VBRAAM message. HLR 162 relays the selected data message packet to CCAD central switch 384, which in turn relays it to MC 353.

In FIG. 20, in another embodiment of the invention, there is shown an air interface uplink pathway which may be utilized, for example when communicator 100 is configured as a PDA. In this case, the MSC 104, during voice pathway and switch trunking procedures, assigns a reverse voice or traffic channel. Here, for forward messaging, the reverse voice or traffic channel is held in reserve and used only to return SAT tone to the currently serving base site so as to maintain a full-duplex SAT loop. If communicator 100 is configured as a full-duplex PDA, the reverse voice or traffic channel is used as a data or text messaging medium in the same manner as that described for the forward voice or traffic channel. Communicator 100, thus configured as a PDA, may now function as a mini computer for selected data messaging, such as text messaging, computer file transfer, multi-character messaging, and the like. For example, such messages may be prepared e-mail to be sent to a particular Internet e-mail address or to another communicator. As conventional origination or call set-up procedures technically require both a forward and reverse traffic or voice channel to be reserved and assigned, during conventional "call set-up" for remote feature access operation procedures, both a forward and a reverse voice and traffic channels are assigned by base site 101. However, as conventional remote feature access operation translation tables do not provide for routing or trunking of the reverse traffic or voice channel for the base site to a trunked PSTN 105 traffic pathway to a remote communicator or other designation, the herein described MPPC 351 provides the means of automatically trunking the assigned and reserved reverse voice or traffic channel to the full-duplex trunked path or data messaging channel 512 that is physically and logically connected to the MPPC 351, as described.

Preferably, the MPPC 351 is configured to utilize conventional multi-frequency wink signalling and ANI transmissions 451 which occur during all PSTN voice path-trunking procedures. Dialogic BCH or full-duplex modernized dialogic card 450, communicativly linked to MPPC 451, is preferably, through one of its ports, communicatively connected to the reserved forward or reverse voice channel or path during trunking as in FIG. 20. Then the trunked or routed voice channel or path 417 detects the awaiting "call" via multi-frequency wink signalling 451 that transpires when the voice channel or path from communicator 100 is initally trunked or routed 417 to the MPPC 351 during the described VBRAAM protocol. MPPC 351 may be configured as specially configured personal computer (PC) communicatively connected to an assigned MSC switch voice path 417, and also communicatively linked to the world wid web (WWW) 352 via an Internet socket. The MPPC 351 preferably contains its own (WWW) 352 socket address. Accordingly, MPPC 351 may function as a point-of-presence on the Internet WWW 352. MC 353 includes data processing terminals that also preferably function as points-of-presence on the WWW 352. MC 353 is also preferably connected both physically and logically to the specially configured CCAD central switch 384, which in turn creates physical and logical connections to MCMS data processing terminals 106, the HLR 162, and the CCAD-Integrated Voice Response (IVR) system 428. When trunking is completed, MSC 104 preferably is programmed to transmit an ANI signal that contains the VBRAAM forward or reverse selected data messages. Dialogic BCH modem card 450 provides duplex ports communicatively linked to the full-duplex voice or traffic path 506 from communciator 100, initially trunked or routed 417 to MPPC 351 during the VBRAAM method. The trunked or routed selected voice or traffic paths 506 detect 417 the awaiting "call" via multi-frequency wink signalling 451. When trunking is completed, MSC 104 transmits an ANI signal containing communciator 100 CIN 452. Preferably, the trunked or routed voice path's MPPC 351 is multi-ported and any idle port available at the time of transmitting a particular VBRAAM forward or reverse selected data message is communicatively connected to a particular trunk for data messaging and is thus an assigned port. As such, MPPC 351 may function to route a forward, reverse, or full-duplex selected data message. The ANI/CIN 452 is then sent to the MPPC 351 via the assigned port. The MPPC 351 detects the ANI/CIN 452, which in turn relays it to the MC 353, via the WWW 352. MC detects the ANI/CIN and send the 50-character message assigned to that CIN via, for example, the WWW 152 to the MPPC 351. The MPPC 351 then converts the selected data message into a data word block or data frame TDMA or CDMA protocol that is compatible with the currently serving MSC 104 via dialogic BCH full-duplex modem card 450. Once the conversion is complete, the selected data message is forwarded to communicator 100 via trunked path 417 and assigned air interface voice path 401. When the complete selected data message is received, the communicator 100, and the currently serving base site 101, terminate the call through conventional call teardown procedures. The communicator 100 user is made aware of the received selected data message because its title is displayed on the communicator 100 LCD display, and may also be signified by, for example, a internal beep tone. Using such VBRAAM methods, selected data messages may be transmitted between individuals, between groups or to groups of individuals, and from individual communicators or groups of communicators to control remote stationary and/or mobile objects and devices. Such selected data messages may be communicated over vast distances such as in FIG. 21, where communication is between cities such as Los Angeles and New York, or between distant foreign countries.

The VBRAAM methodology and apparatuses described provide a true two-way bandwidth on demand data messaging system. The method and apparatuses may be used with any wireless communications network, such as cellular, PCS, or mobile satellite, and may be communicatively linked with the Internet WWW, allowing for Internet communications and specialized Internet-based services for businesses and individuals. The VBRAAM forward and reveres messaging system provides for full-duplex communications and an almost infinite variety of forward and reverse messaging services on voice and traffic channels, in both analog and digital systems. For example, the VBRAAM method may be used for full-duplex data text, data, fax, computer file transfer, two-way paging, electronic mail, Internet messages and service, point-to-point and point-to-omni point communications, global positioning system data for automatic vehicle location systems, fleet management, motor vehicle anti-theft and anti-theft recovery, emissions standards compliance monitoring, personal tracking and protection, child location, home arrest, behavior modification, medical alert, outpatient monitoring, debit and metered billing for cellular, PCS and mobile satellite networks, anti-fraud and anti-cloning applications, and other stationary and mobile-based systems and services. Additional application-specific systems and services such as full-duplex stationary system remote control, electrical meter reading, electrical load partitioning, and electrical load management for commercial and residential uses, smart home management systems, security systems, gas and oil well head management and control, vending machine management and control, environmental systems management and control, point-of-sale data messaging, credit card verification, and the like. The reverse RAAM short messaging aspect of the system is transmitted on the control channels and digital access channels, providing the means to trigger the VBRAAM data messaging events. The VBRAAM method and apparatuses may be implemented either on a local level, a national level, or in a worldwide global network linked by the world wide web, communication satellite networks, and various formats of signaling networks as described.

Accordingly, additional objects and advantages will readily occur to those skilled in the art. The applications of the present methodology and apparatus are broad and may be used in a truly wide range of applications in wireless communications. Accordingly, the invention in its broader aspects is not limited to the specific details, representative device, and illustrative examples shown and described.

What is claimed is:

1. A method for communicating application specific messages between a communicator and a central monitoring station (CMS) over a telecommunications network that includes voice channels and a control channel, wherein the voice channels convey data messages and the control channel conveys control messages that manage access to and use of the voice channels, the method comprising:

a) obtaining an application specific message at the communicator, the application specific message comprising application specific data;

b) encoding a message in a sequence of digits associated with a control message to create an encoded message;

c) encoding a remote feature control request (RFCR) in the sequence of digits associated with the control message to invoke the forwarding of the sequence of digits, including the encoded message, by a local telecommunications switching center (LTSC) upon detecting the RFCR;

d) transmitting the control message and the associated sequence of digits to the LTSC over the control channel, bypassing the voice channels;

e) assigning a voice channel between the LTSC and the communicator in response to the LTSC receiving the control message;

f) detecting the RFCR in the sequence of digits associated with the control message at the LTSC;

g) establishing a first and a second communications channel between the LTSC and the CMS, and forwarding the RFCR and the encoded message over the first communications channel to the CMS in response to detecting the RFCR;

h) decoding the encoded message at the CMS;

i) transmitting data messages, including the application specific message, between the communicator and the CMS via the voice channel, LTSC, and the second communications channel.

2. The method of claim 1, wherein obtaining an application specific message at the communicator includes:

a) transmitting the application specific message from a remote monitoring device to the communicator; and b) receiving the application specific message at the communicator.

3. The method of claim 2, wherein the remote monitoring device comprises an alarm system, and receiving the application specific message at the communicator comprises receiving data specifying a status of an alarm system at the communicator.

4. The method of claim 2, wherein the remote monitoring device comprises a tracking system, and receiving the application specific message at the communicator comprises receiving tracking data from the tracking system at the communicator.

5. The method of claim 2, wherein the remote monitoring device comprises a utility meter, and receiving the application specific message at the communicator comprises receiving a reading from the utility meter at the communicator.

6. The method of claim 2, wherein the remote monitoring device is a two-way paging device, and receiving an application specific message at the communicator comprises receiving a response to a page from a two-way paging device.

7. The method of claim 1, wherein encoding a message in a sequence of digits associated with a control message comprises encoding the message in a sequence of digits associated with a call origination message.

8. A method for communicating messages between a cellular mobile radio (CMR) communications device and a central monitoring device (CMD) over a cellular telephone network that includes wireless digital traffic channels and inter cellular serving area network channels, wherein the digital traffic channels comprise data traffic channels for transmitting voice and data signals and a control channel for transmitting control signals that manage access to and use of the data traffic channels, the method comprising a) inserting a message in a sequence of digits to be transmitted by the CMR communications device in conjunction with transmitting a call origination message;

b) encoding a remote feature control request (RFCR) in the sequence of digits to invoke the forwarding of the sequence of digits, including the message, by a serving mobile switching center (MSC) upon detecting the RFCR;

c) transmitting the call origination message and the sequence of digits to the serving MSC over the control channel, bypassing the data traffic channels, the call origination message specifying a mobile identification number (MIN) identifying the CMR communications device;

d) assigning a data traffic channel between the serving MSC and the CMR communications device in response to the serving MSC receiving the call origination message;

e) analyzing the call origination message and the sequence of digits at the serving MSC and detecting the RFCR;

f) establishing an inter cellular serving area network channel and a communications channel between the serving MSC and the CMD, and forwarding the RFCR and the message over the inter cellular serving area network channel to the CMD, in response to detecting the RFCR, wherein the inter cellular serving area network channel is determined by the MIN;

g) receiving the RFCR and the message at the CMD and extracting the message;

h) transmitting a data message comprising application specific data between the CMR communications device and the CMD via the data traffic channel, the serving MSC, and the communications channel.

9. The method of claim 8, comprising the following, before inserting a message in a sequence of digits, a) transmitting an application specific message comprising application specific data from a remote monitoring device coupled in communication with the CMR communications device; and b) receiving the application specific message at the CMR communications device.

10. The method of claim 9, wherein the remote monitoring device comprises an alarm system, and receiving the application specific message at the CMR communications device comprises receiving data specifying a status of an alarm system at the CMR communications device.

11. The method of claim 9, wherein the remote monitoring device comprises a tracking system, and receiving the application specific message at the CMR communications device comprises receiving tracking data from the tracking system at the CMR communications device.

12. The method of claim 9, wherein the remote monitoring device comprises a utility meter, and receiving the application specific message at the CMR communications device comprises receiving a reading from the utility meter at the CMR communications device.

13. The method of claim 9, wherein the remote monitoring device is a two-way paging device, and receiving an application specific message at the CMR communications device comprises receiving a response to a page at the CMR communications device from the two-way paging device.

14. The method of claim 9, wherein the application specific message comprises a response to a command from the CMD received via a paging network broadcast channel.

15. The method of claim 9 wherein the application specific message comprises a response to a command from the CMD received via a satellite communications channel.

16. The method of claim 9 wherein the application specific message comprises a response to an instruction received from the CMD over a time division multiple access (TDMA) digital broadcast control channel.

17. The method of claim 9 wherein the application specific message comprises a response to an instruction received from the CMD over a code division multiple access (CDMA) digital broadcast control channel.

18. A method for communicating messages between a communicator and a central monitoring station (CMS) over a mobile satellite communications network that includes voice channels and a control channel, wherein the voice channels convey data messages and the control channel conveys control messages that manage access to and use of the voice channels, the method comprising:

a) obtaining an application specific message at the communicator, the application specific message comprising application specific data;

b) encoding a message in a sequence of digits associated with a control message to create an encoded message;

c) encoding a remote feature control request (RFCR) in the sequence of digits associated with the control message to invoke the forwarding of the sequence of digits, including the encoded message, by a local mobile satellite communications switching center upon detecting the RFCR;

d) transmitting the control message and the associated sequence of digits to the local mobile satellite communications switching center over the control channel, bypassing the voice channels;

e) assigning a voice channel between the local mobile satellite communications switching center and the communicator in response to the local mobile satellite communications switching center receiving the control message;

f) detecting the RFCR in the sequence of digits associated with the control message at the local mobile satellite communications switching center;

g) establishing a first and a second communications channel between the local mobile satellite communications switching center and the CMS, and forwarding the RFCR and the encoded message over first communications channel to the CMS in response to detecting the RFCR;

h) decoding the encoded message;

i) transmitting a data message comprising the application specific message between the communicator and the CMS via the voice channel, local mobile satellite communications switching center, and the second communications channel.

19. The method of claim 18, wherein obtaining an application specific message at the communicator includes:

a) transmitting the application specific message from a remote monitoring device to the communicator; and b) receiving the application specific message at the communicator.

20. The method of claim 19, wherein the remote monitoring device comprises an alarm system, and receiving the application specific message at the communicator comprises receiving data specifying a status of an alarm system at the communicator.

21. The method of claim 19, wherein the remote monitoring device comprises a tracking system, and receiving the application specific message at the communicator comprises receiving tracking data from the tracking system at the communicator.

22. The method of claim 19, wherein the remote monitoring device comprises a utility meter, and receiving the application specific message at the communicator comprises receiving a reading from the utility meter at the communicator.

23. The method of claim 19, wherein the remote monitoring device is a two-way paging device, and receiving an application specific message at the communicator comprises receiving a response to a page from a two-way paging device.

24. The method of claim 18, wherein encoding the message in a sequence of digits associated with a control message comprises encoding the message in a sequence of digits associated with a call origination message.

* * * * *